United States Patent
Matsuzaki et al.

(10) Patent No.: US 10,434,808 B2
(45) Date of Patent: Oct. 8, 2019

(54) INK JET RECORDING METHOD

(71) Applicant: Seiko Epson Corporation, Tokyo (JP)

(72) Inventors: Akiko Matsuzaki, Matsumoto (JP); Mitsuaki Kosaka, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/895,365

(22) Filed: Feb. 13, 2018

(65) Prior Publication Data

US 2018/0281492 A1    Oct. 4, 2018

(30) Foreign Application Priority Data

Mar. 28, 2017  (JP) ................. 2017-063446

(51) Int. Cl.

| | |
|---|---|
| B41M 5/00 | (2006.01) |
| B41J 2/01 | (2006.01) |
| C09D 11/023 | (2014.01) |
| C09D 11/322 | (2014.01) |
| C09D 11/54 | (2014.01) |
| B41J 11/00 | (2006.01) |
| C09D 11/38 | (2014.01) |
| C09D 11/40 | (2014.01) |

(52) U.S. Cl.
CPC .............. *B41M 5/0017* (2013.01); *B41J 2/01* (2013.01); *B41J 11/002* (2013.01); *C09D 11/023* (2013.01); *C09D 11/322* (2013.01); *C09D 11/38* (2013.01); *C09D 11/40* (2013.01); *C09D 11/54* (2013.01); *B41M 5/0011* (2013.01)

(58) Field of Classification Search
CPC .... B41J 11/002; C09D 11/023; C09D 11/322; C09D 11/28; C09D 11/40; C09D 11/54; B41M 5/0017
See application file for complete search history.

(56) References Cited

U.S. PATENT DOCUMENTS

| | | | |
|---|---|---|---|
| 2009/0142552 A1* | 6/2009 | Craamer et al. | ........... 428/195.1 |
| 2011/0292117 A1 | 12/2011 | Goto et al. | |
| 2012/0308786 A1 | 12/2012 | Shioda et al. | |
| 2014/0055520 A1 | 2/2014 | Inumaru et al. | |
| 2014/0132661 A1 | 5/2014 | Inumaru et al. | |

(Continued)

FOREIGN PATENT DOCUMENTS

| | | |
|---|---|---|
| JP | 4956666 B2 | 6/2012 |
| JP | 5480446 B2 | 4/2014 |
| JP | 5489126 B2 | 5/2014 |

(Continued)

*Primary Examiner* — Juanita D Jackson
(74) *Attorney, Agent, or Firm* — Harness, Dickey & Pierce, P.L.C.

(57) ABSTRACT

An ink jet recording method includes attaching a reaction solution which contains an aggregating agent for aggregating a component of a water-based ink composition to a recording region of a recording medium, and attaching a water-based ink composition which contains a pigment dispersion containing a surface-treated pigment and water to the recording region of the recording medium by discharging the water-based ink composition from an ink jet head, in which the recording region includes a region in which an attachment amount of the water-based ink composition is in a range of 2 times to 20 times the attachment amount of the reaction solution.

15 Claims, 2 Drawing Sheets

(56) References Cited

U.S. PATENT DOCUMENTS

2016/0303873 A1* 10/2016 Okuda et al. ........ B41J 11/0015

FOREIGN PATENT DOCUMENTS

| | | |
|---|---|---|
| JP | 5750838 B2 | 7/2015 |
| JP | 2015-227003 A | 12/2015 |
| JP | 5828784 B2 | 12/2015 |
| JP | 5834110 B1 | 12/2015 |

* cited by examiner

INK JET RECORDING METHOD

BACKGROUND

1. Technical Field

The present invention relates to an ink jet recording method.

2. Related Art

An ink jet recording method of discharging minute ink droplets from an ink jet head nozzle of an ink jet recording apparatus so as to record an image on a recording medium has been known, and applications thereof in a sign printing field and a high-speed label printing field have been considered. In addition, in a case where recording is performed on a recording medium having low ink absorbability (for example, art paper or coated paper) or a recording medium having non-ink absorbability (for example, a plastic film), using a water-based ink composition (hereinafter, referred to as "water-based ink" or simply referred to as "ink") as ink has been considered from the viewpoint of global environment and human safety.

In the water-based ink composition, the pigment has a property of being resistant to discoloration against light, gas, and the like, and thus is used as a coloring material. In recording using the water-based ink composition containing this pigment, a reaction solution containing an aggregating agent that aggregates ink components may be used in order to perform the recording in which bleeding is suppressed by fixing the ink at an early stage (for example, refer to JP-A-2015-227003).

However, when recording is performed by using a reaction solution in order to obtain excellent image quality, there is a problem in that discharge stability is deteriorated depending on ink. In addition, when the reaction solution contains an aggregating agent, there is a problem in that the abrasion resistance of the obtained recorded material is deteriorated. Furthermore, glossiness and wet abrasion resistance of the recorded material are deteriorated. In addition, depending on the ink, there is also a problem of poor storage stability.

SUMMARY

An advantage of some aspects of the invention is to provide an ink jet recording method which is capable of obtaining a recorded material which is excellent in image quality, abrasion resistance, and discharge stability.

The invention can be realized in the following aspects or application examples.

Application Example 1

According to an aspect of the invention, there is provided an ink jet recording method including attaching a reaction solution which contains an aggregating agent for aggregating a component of a water-based ink composition to a recording region of a recording medium; and attaching the water-based ink composition which contains a pigment dispersion containing a surface-treated pigment and water to the recording region of the recording medium by discharging the water-based ink composition from an ink jet head, in which the recording region includes a region in which an attachment amount of the water-based ink composition is in a range of 2 times to 20 times an attachment amount of the reaction solution.

According to the application example, when the surface-treated pigment is used as a pigment contained in the water-based ink composition, reactivity between the pigment in the ink and the aggregating agent of the reaction solution is improved so that sufficient image quality can be obtained even if the coating amount of the reaction solution is reduced. With this, even when the coating amount of the reaction solution is reduced, it is possible to secure sufficient image quality, and at the same time, it is possible to secure the abrasion resistance of the obtained recorded material by reducing the coating amount of the reaction solution. In this way, according to the application example, it is possible to provide an ink jet recording method of obtaining a recorded material which is excellent in the discharge stability and is excellent in the image quality and the abrasion resistance by reducing the coating amount of the reaction solution.

Application Example 2

In the application example, it is preferable that a pigment having at least any one of a phosphorus-containing group, a sulfonyl group, and a carbonyl group be contained as the surface-treated pigment on a surface.

According to the application example, when the pigment having at least any one of the phosphorus-containing group, the sulfonyl group, and the carbonyl group on the surface is contained as the surface-treated pigment, the reactivity of the aggregating agent of the reaction solution is improved, and thereby it is possible to obtain a recorded material which is more excellent in the discharge stability and excellent in the image quality and the abrasion resistance.

Application Example 3

In the application example, it is preferable that the attaching of the reaction solution be attaching the reaction solution to the recording region of the recording medium by discharging the reaction solution from the ink jet head.

According to the application example, when the reaction solution is attached to the recording medium by using the ink jet head, the recording medium can be uniformly coated with the reaction solution, and thus the ink and the reaction solution sufficiently react with each other, and thereby the image quality is further improved. In addition, the recording medium is uniformly coated with the reaction solution, and thus it is possible to reduce the coating amount of the reaction solution, and to secure the abrasion resistance of the obtained image.

Application Example 4

In the application example, it is preferable that a conductivity of the water-based ink composition be in a range of 500 μs/cm to 3100 μs/cm.

According to the application example, when the conductivity of the water-based ink composition is in a range of 500 μs/cm to 3100 μs/cm, the dispersion stability of the component in the ink can be obtained, and it is possible to obtain the water-based ink composition excellent in the discharge stability and the storage stability.

Application Example 5

It is preferable that heating the recording medium be further included, in which the attaching ink composition is attaching the water-based ink composition to the recording medium heated in the heating.

According to the application example, when drying is promoted during printing, and thereby the image quality is further improved. In addition, when the drying during the printing advances, it is possible to secure the abrasion resistance of the obtained image.

Application Example 6

In the application example, it is preferable that the attachment amount of the reaction solution be equal to or less than 2.5 mg/inch$^2$ in a region in which the attachment amount of the water-based ink composition is in a range of 2 times to 20 times the attachment amount of the reaction solution.

According to the application example, when the attachment amount of the reaction solution is equal to or less than 2.5 mg/inch$^2$ in a region in which the attachment amount of the water-based ink composition is in a range of 2 times to 20 times the attachment amount of the reaction solution, it is possible to reduce the amount of the aggregating agent, and a dry load is reduced, and thus it is possible to secure the abrasion resistance of the obtained image.

Application Example 7

In the application example, it is preferable that a content of an aggregating agent of the reaction solution be in a range of 1% by mass to 15% by mass.

According to the application example, when the content of the aggregating agent of the reaction solution is in a range of 1% by mass to 15% by mass, the amount of the aggregating agent can be made appropriate, and thereby it is possible to obtain a recorded material which is more excellent in the image quality and the abrasion resistance.

Application Example 8

In the application example, it is preferable that the attachment amount of the water-based ink composition be in a range of 5 mg/inch$^2$ to 17 mg/inch$^2$ in the region in which the attachment amount of the water-based ink composition is in a range of 2 times to 20 times the attachment amount of the reaction solution.

According to the application example, when the attachment amount of the water-based ink composition is in a range of 5 mg/inch$^2$ to 17 mg/inch$^2$ in the region in which the attachment amount of the water-based ink composition is in a range of 2 times to 20 times the attachment amount of the reaction solution, it is possible to secure sufficient optical density so as to form an image quality and to secure the dryability, and thus it is possible to obtain the recorded material which is excellent in the image quality and the abrasion resistance, and is more excellent in the glossiness.

Application Example 9

In the application example, it is preferable that the aggregating agent be at least one selected from the group consisting of a polyvalent metal salt, a cationic compound, and an organic acid.

According to the application example, when the aggregating agent is at least one selected from the group consisting of a polyvalent metal salt, a cationic compound, and an organic acid, the reactivity with an ink component is improved. With this, the occurrence of bleeding is suppressed, and the water resistance and the abrasion resistance are improved, thereby obtaining the recorded material which is excellent in the image quality.

Application Example 10

In the application example, it is preferable that the recording medium be a recording medium having low ink absorbability or a recording medium having non-ink absorbability.

According to the application example, even in a case where the recording medium is a recording medium having low ink absorbability or a recording medium having non-ink absorbability, an ink jet recording method in which the film forming properties of the ink coated film are excellent, an image excellent in the abrasion resistance and the image quality can be formed, and the discharge stability is excellent is realized.

Application Example 11

In the application example, it is preferable that in the water-based ink composition, a content of an organic solvent having a standard boiling point of higher than 280° C. be equal to or less than 3% by mass.

According to the application example, when the content of the organic solvent having a standard boiling point of higher than 280° C. is equal to or less than 3% by mass, the dryability of the ink liquid on the recording medium becomes improved, the occurrence of bleeding is suppressed, and the water resistance and the abrasion resistance are improved, thereby obtaining the recorded material which is excellent in the image quality.

Application Example 12

In the application example, it is preferable that a region in which the attachment amount of the water-based ink composition is the maximum in the recording region be a region in which the attachment amount of the water-based ink composition is in a range of 2 times to 20 times the attachment amount of the reaction solution.

According to the application example, when the region in which the attachment amount of the water-based ink composition is the maximum in the recording region is the region in which the attachment amount of the water-based ink composition is in a range of 2 times to 20 times the attachment amount of the reaction solution, it is possible to reduce the amount of the aggregating agent, and also possible to secure the abrasion resistance of the obtained image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described below. The embodiments described below explain one example of the invention. The invention is not limited to the following embodiments at all, and includes various modifications that are performed without changing the gist of the invention.

An aspect of an ink jet recording method according to the embodiment includes a reaction solution attaching step of attaching a reaction solution which contains an aggregating agent for aggregating a component of a water-based ink composition to a recording area of a recording medium, and an ink composition attaching step of attaching a water-based ink composition which contains a pigment dispersion containing a surface-treated pigment and water to the recording area of the recording medium by discharging the water-based ink composition from an ink jet head, in which the recording area includes an area in which an attachment amount of the water-based ink composition is in a range of 2 times to 20 times the attachment amount of the reaction solution.

Hereinafter, regarding the ink jet recording method according to the embodiment, each configuration of an ink jet recording apparatus which performs recording by this recording method, a water-based ink composition, a reaction solution, and a recording medium, and an ink jet recording method will be described in this order.

1. Configurations

1.1. Ink Jet Recording Apparatus

An example of an ink jet recording apparatus in which an ink jet recording method according to the embodiment is executed will be described with reference to the drawings. Note that, the ink jet recording apparatus that can be used for the ink jet recording method according to the embodiment is not limited to the following examples.

Figure 1:
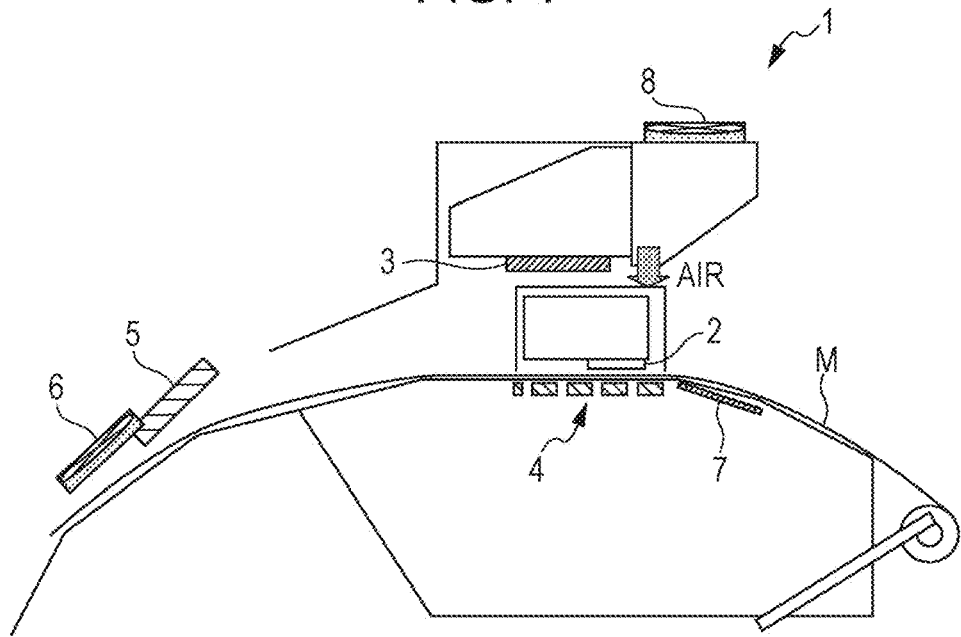
FIG. 1 is a schematic sectional view schematically illustrating an ink jet recording apparatus.

An example of the ink jet recording apparatus that can be used in the ink jet recording apparatus used in the embodiment will be described with reference to the drawings. FIG. 1 is a schematic sectional view schematically illustrating an ink jet recording apparatus. As illustrated in FIG. 1, an ink jet recording apparatus 1 is provided with an ink jet head 2, an IR heater 3, a platen heater 4, a hardening heater 5, a cooling fan 6, a preheater 7, and a ventilation fan 8. The ink jet recording apparatus 1 is provided a control unit (not shown), and an operation of the entire ink jet recording apparatus 1 is controlled by the control unit. The recording medium is transported by driving a shaft of a paper feeding roller or by driving shafts of a transport roller and a winding roller (not shown). In particular, it is preferable to transport the recording medium by a driving unit positioned upstream and a driving unit positioned downstream in the transporting direction from the ink jet head 2 in terms of transporting accuracy and transporting speed.

Figure 2:
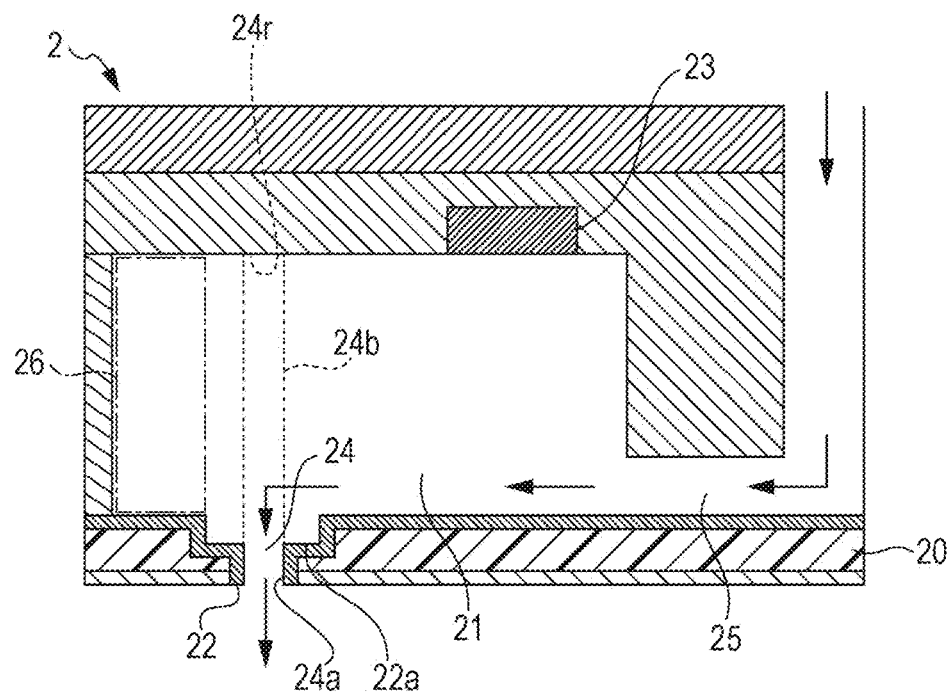
FIG. 2 is a schematic sectional view schematically illustrating a structure of an ink jet head as illustrated in FIG. 1.

The ink jet head 2 is a unit that discharges and attaches the ink composition to the recording medium M, and for example, ones having the type illustrated in in FIG. 2 can be used.

The ink jet head 2 is provided with a nozzle 22 for discharging an ink composition. Examples of a method of discharging ink from a nozzle include a method of applying a strong electric field between a nozzle and an accelerating electrode placed in front of the nozzle to continuously discharge droplet-like ink from the nozzle, and discharging the ink corresponding to a recording information signal while the ink droplet flies between deflecting electrodes (an electrostatic suction method); a method of applying pressure to ink with a small pump and mechanically vibrating the nozzle with a crystal oscillator or the like so as to forcibly discharge the ink droplet; a method of applying a pressure and a recording information signal to ink at the same time with a piezoelectric element so as to discharge the ink droplet and perform recording (a piezo method); and a method of heating and foaming ink with a microelectrode in accordance with a recording information signal so as to discharge the ink droplet and perform recording (a thermal jet method).

As the ink jet head 2, any of a line type ink jet head and a serial type ink jet head can be used.

Here, the ink jet recording apparatus which is provided with the serial type ink jet head performs recording by performing scanning (passing) for discharging the ink composition while moving the ink jet head for recording relative to the recording medium a plurality of times. Specific examples of the serial type ink jet head include an ink jet head which is mounted on a carriage which moves in the width direction of the recording medium (the direction intersecting with the transport direction of the recording medium), and is moved as the carriage moves so as to discharge liquid droplets onto the recording medium.

On the other hand, ink jet recording apparatus provided with the line type ink jet head performs recording by performing scanning (passing) for discharging the ink composition while moving the ink jet head for recording relative to the recording medium once. Specific examples of the line type ink jet head include an ink jet head which is formed to be wider than the width of the recording medium and discharges liquid droplets onto the recording medium without moving the recording head.

In the embodiment, as the ink jet recording apparatus 1, the ink jet recording apparatus provided with the serial type ink jet head is used, and the ink jet head 2 which uses the piezo method as a method of discharging ink from the nozzle is used.

FIG. 2 is a schematic sectional view schematically illustrating a structure of the ink jet head 2. In FIG. 2, the arrow indicates the movement direction of the ink in the ink jet head 2. The ink jet head 2 is provided with a pressure chamber 21 and a piezoelectric element 23 which discharges the ink composition from the nozzle 22 by applying the pressure to the pressure chamber 21. In the pressure chamber 21, a piezoelectric element 23 is disposed at a position other than a position 24r facing an outflow port 24 communicating with the nozzle 22. In a case where the piezoelectric element 23 is provided directly on the nozzle 22, from a push force of ink from the piezoelectric element 23 is directly transferred to an ink film which is attached on to a wall surface 24a, and thus it is possible to remove the attachment of the ink film; whereas in a case were the piezoelectric element 23 is not provided directly on the nozzle 22, it is difficult to remove the attachment of the ink film, and form this aspect, the ink jet recording method according to the embodiment is useful.

FIG. 2 is a schematic sectional view schematically illustrating a structure of the ink jet head 2. In FIG. 2, the arrow indicates the movement direction of the ink. The ink jet head 2 is provided with a pressure chamber 21 and a piezoelectric element 23 which discharges the ink composition from the nozzle 22 by applying the pressure to the pressure chamber 21. In the pressure chamber 21, a piezoelectric element 23 is disposed at a position other than a position 24r facing an outflow port 24 communicating with the nozzle 22. In a case where the piezoelectric element 23 is provided directly on the nozzle 22, from a push force of ink from the piezoelectric element 23 is directly transferred to an ink film which is attached on to a wall surface 24a, and thus it is easy to remove the attachment of the ink film; whereas in a case were the piezoelectric element 23 is not provided directly on the nozzle 22, when the ink film is attached, it is difficult to remove the attachment of the ink film. The ink jet recording method according to the embodiment is, for example, a recording method in which the ink film is less likely to be attached on the wall surface 24a or the like in the case were the piezoelectric element 23 is not provided directly on the nozzle 22 as described above.

Here, the position 24r facing the outflow port 24 which communicates with the nozzle 22 in the pressure chamber 21 means a position immediately above the nozzle 22, and in FIG. 2, and means an extended line 24b and an area surrounded by the extended line 24b in a case where a line (which is indicated as a broken line in FIG. 2) is extended from the wall surface 24a of the outflow port 24 to the upper side in FIG. 2). For example, in a case of the ink jet head 2 in FIG. 2, the outflow port 24 indicates a portion in which the area in the direction orthogonal to the direction to which ink is discharged is the same portion as the nozzle 22, and is not a portion which became wider in the middle. Accordingly, the fact that the piezoelectric element 23 is disposed in the position other than the position 24r means that at least a portion of the piezoelectric element 23 is not positioned in at least a portion of this region (position 24r). As another example of the ink jet head in which the piezoelectric element 23 is not directly provided on the nozzle 22, for example, an ink jet head in which the piezoelectric element is provided on the wall of either the front side or the back side of the pressure chamber 21 in FIG. 2 can be exemplified.

The pressure chamber 21 includes a retention portion 26 in which ink is retained in the direction extending from the ink movement direction connecting a supply port 25 through which ink is supplied to the pressure chamber 21, and to the outflow port 24 of the pressure chamber 21. The retention portion 26 is a portion formed in a step of mass-producing the ink jet head 2, and thus it is difficult to mass-produce an ink jet head provided with a pressure chamber 21 without the retention portion 26. In this retention portion 26, the ink composition is likely to stagnate and an ink dried matter (a resin welded matter) is likely to accumulate. In addition, when bubbles are collected so as to create a space, an ink dried matter is likely to be attached on the wall surface of the pressure chamber 21, and even in a case where the ink jet head 2 having such a retention portion 26 is used by using the ink jet recording method according to the embodiment, the ink dried matter is less likely to be retained.

The ink jet head 2 may also include a step 22a in a flow path through which the ink passes between the pressure chamber 21 and the nozzle 22, that is, on the downstream from the pressure chamber 21. This step 22a may be generated in the process of manufacturing the ink jet head 2. For example, the step 22a is a portion that is generated when the nozzle 22 is formed by etching a silicon layer (a nozzle plate 20), and thus it is difficult to form the nozzle plate 20 on which the step 22a is removed by etching the silicon layer. This step 22a is not limited to be formed in the nozzle plate 20 as long as it is formed between the outflow port 24 and the nozzle 22 of the pressure chamber 21. The bubbles may be attached to remain on the step 22a during initial filling or cleaning of the ink, and the bubbles are floated from the step 22a during recording and are collected above the pressure chamber 21, and here, a gas-liquid interface is generated to dry the ink, and thereby an ink dried matter (resin welded matter) is generated in some cases. In contrast, the ink jet recording method according to the embodiment is useful used, and even in a case of used the ink jet head 2 including such a step 22a, the ink dried matters are less likely to accumulate.

In the embodiment, a plurality of the pressure chamber 21, discharge driving units (not shown), and the nozzles 22 provided for each of the pressure chamber 21 of the ink jet head 2 each may be independently provided on one head. Here, discharge driving unit can be formed by using an electromechanical conversion element such as a piezoelectric element 23 for changing the volume of the pressure chamber 21 by mechanical deformation, and an electrothermal conversion element for emitting heat so as to generate and discharge bubbles to the ink.

Returning to FIG. 1, the ink jet recording apparatus 1 includes the IR heater 3 and the platen heater 4 for heating the recording medium M at the time of discharging the ink composition from the ink jet head 2. When the recording medium M is heated in the attaching step of the water-based ink composition used in the embodiment, at least one of the IR heater 3 and the platen heater 4 may be used.

Note that, when the IR heater 3 is used, it is possible to heat the recording medium M from the ink jet head 2 side. With this, the ink jet head 2 is likely to be heated at the same time, but as compared with the case of heating the rear surface of the recording medium M by the platen heater 4, it is possible to raise the temperature without being affected by the thickness of the recording medium M. Further, when the platen heater 4 is used at that time of heating the recording medium M, it is possible to heat the recording medium M from the side opposite to the ink jet head 2 side. With this, the ink jet head 2 is relatively less likely to be heated. Here, the surface temperature of the recording medium M by the IR heater 3 or the platen heater 4 is preferably in a range of 25° C. to 60° C., is further preferably in a range of 30° C. to 50° C. and is still further preferably in a range of 35° C. to 45° C. With this, the radiation heat received from the IR heater 3 and the platen heater 4 is reduced or eliminated, and thus drying of the ink composition and composition variation thereof in the ink jet head 2 can be suppressed, and welding of the ink or the resin to the inner wall of the ink jet head 2 can be reduced.

The hardening heater 5 is for drying and solidifying the ink composition attached on the recording medium M. When the hardening heater 5 heats the recording medium M on which the image is recorded, the moisture contained in the ink composition more rapidly evaporates and the ink film is formed by the resin of the resin fine particles contained in the ink composition. In this way, the ink film firmly fixes (attaches) to the recording medium M and thus is excellent in the film forming properties, and thereby it is possible to obtain a high-quality image in a short period time. The drying temperature by the hardening heater 5 is preferably in a range of 40° C. to 120° C., is further preferably in a range of 60° C. to 100° C., and is still further preferably in a range of 80° C. to 90° C.

The ink jet recording apparatus 1 may include a cooling fan 6. After drying the ink composition recorded on the recording medium M, the ink composition on the recording medium M is cooled by the cooling fan 6 so that an ink coated film can be formed on the recording medium M with good adhesion.

In addition, the ink jet recording apparatus 1 may include a preheater 7 for previously heating (preheating) a recording medium M before discharging the ink composition on the recording medium M. Further, the recording apparatus 1 may include a ventilation fan 8 such that the ink composition attached on the recording medium M is more efficiently dried.

1.2. Water-Based Ink Composition

Next, the water-based ink composition used in the embodiment will be described. The water-based ink composition used in the embodiment contains a pigment dispersion containing a surface-treated pigment, and water. Hereinafter, components contained in the water-based ink composition used in the embodiment and components can be contained therein will be described in detail.

Note that, the "water-based" ink composition in the invention means a composition in which water is used as a main solvent and an organic solvent is not used as the main solvent. The content of the organic solvent in the composition is preferably equal to or less than 30% by mass, is further preferably equal to or less than 25% by mass, and is particularly preferably equal to or less than 20% by mass, with respect to 100% by mass of the composition. The content of water in the ink composition (100% by mass) is preferably equal to or greater than 50% by mass, is further preferably equal to or greater than 60% by mass, and is particularly preferably equal to or greater than 70% by mass.

1.2.1. Surface-Treated Pigment

In the embodiment, the water-based ink composition contains a pigment dispersion containing a surface-treated pigment. The pigment has a property of being resistant to fading with respect to light, gas, and the like, and thus can be preferably used. In addition, a recorded material formed on a recording medium having non-ink absorbability or low ink absorbability using a pigment is excellent in not only the image quality but also water resistance, gas resistance, and light resistance, and has excellent storage stability.

In the embodiment, the pigment to be surface-treated, of the surface-treated pigment, is not particularly limited, and examples thereof include an inorganic pigment and an organic pigment. Examples of the inorganic pigment include titanium oxide, iron oxide, and carbon black manufactured by a known method such as a contact method, a furnace method, and a thermal method. On the other hand, examples of the organic pigment include an azo pigment (such as azolake, an insoluble azo pigment, a condensed azo pigment, and a chelate azo pigment), a polycyclic pigment (such as a phthalocyanine pigment, a perylene pigment, a perinone pigment, an anthraquinone pigment, and a quinophthalone pigment), a nitro pigment, a nitroso pigment, and aniline black.

Among the specific examples of the pigments which are can be used in the embodiment, carbon black is exemplified as a black pigment. The carbon black not particularly limited, and examples thereof include Furnace Black, Lamp Black, Acetylene Black, and Channel Black (C.I. Pigment Black 7), and commercially available products such as No. 2300, 900, MCF88, No. 20B, No. 33, No. 40, No. 45, No. 52, MA7, MA8, MA77, MA100, and No. 2200B (product names which are manufactured by Mitsubishi Chemical Corporation), Color Blacks FW1, FW2, FW2V, FW18, FW200, 5150, 5160, 5170, Printexs 35, U, V, and 140U, Special Blacks 6, 5, 4A, 4, and 250 (product names which are manufactured by Evonik Degussa Gmbh), Conductex SC, Ravens 1255, 5750, 5250, 5000, 3500, 1255, and 700 (product names which are manufactured by Columbia), Regals 400R, 330R, and 660R, Mogul L, Monarchs 700, 800, 880, 900, 1000, 1100, 1300, and 1400, and Elftex (product names which are manufactured by Cabot Corporation).

The white pigment is not particularly limited, and examples thereof include C.I. Pigment Whites 6, 18, and 21, a white inorganic pigment of titanium oxide, zinc oxide, zinc sulfide, antimony oxide, magnesium oxide, and zirconium oxide. In addition to the white inorganic pigment, a white organic pigment such as white hollow resin fine particles and polymer particles can be used.

A pigment used for the yellow ink is not particularly limited, and examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A pigment used for the magenta ink is not particularly limited, examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violets 19, 23, 32, 33, 36, 38, 43, and 50.

A pigment used for the cyan ink is not particularly limited, and examples thereof include C.I. Pigment Blues 1, 2, 3, 15, 15:1, 15:2, 15:3, 15:34, 15:4, 16, 18, 22, 25, 60, 65, and 66, and C.I. Bad Blues 4 and 60.

A pigment used for color ink other than magenta, cyan, and yellow is not particularly limited, and examples thereof include C.I. Pigment Greens 7 and 10, C.I. Pigment Browns 3, 5, 25, and 26, C.I. Pigment Oranges 1, 2, 5, 7, 13, 14, 15, 16, 24, 34, 36, 38, 40, 43, and 63.

A pearl pigment is not particularly limited, and examples thereof include a pigment having pearly luster and interference gloss such as titanium dioxide-coated mica, fish scale foil, and bismuth oxychloride.

A metallic pigment is not particularly limited, but examples thereof include particles made of a monomer such as aluminum, silver, gold, platinum, nickel, chromium, tin, zinc, indium, titanium, and copper, or an alloy thereof.

In order to apply the pigment to the water-based ink composition, it is necessary to stably disperse and retain the pigment in water. Examples of the method thereof include a method of dispersing a pigment with a resin dispersant such as a water-soluble and/or a water-dispersible resin (hereinafter, a pigment which is dispersed by this method is referred to as a "resin dispersed pigment"), a method of dispersing a pigment with a surfactant of a water-soluble surfactant and/or a water-dispersible surfactant (hereinafter, a pigment which is dispersed by this method is referred to as a "surfactant dispersed pigment"), and a method of dispersing and/or dissolving a pigment in water without a dispersant such as the above-mentioned resin or surfactant by chemically and physically introducing a hydrophilic functional group to a pigment particle surface (hereinafter, a pigment which is dispersed by this method is referred to as a "surface-treated pigment").

In the embodiment, the water-based ink composition stably disperses and retains the pigment in water by using a surface-treated pigment, but if necessary, a resin dispersant or a surfactant may be used in combination.

In the embodiment, as the surface-treated pigment, it is preferable to contain a pigment having at least any one of a phosphorus-containing group, a sulfonyl group, and a carbonyl group on the surface. When a pigment having at least any one of a phosphorus-containing group, a sulfonyl group, and a carbonyl group on the surface is contained as the surface-treated pigment, it is possible to obtain a recorded material which is more excellent in the image quality and the abrasion resistance.

As the phosphorus-containing group, it is preferable to have any one of a P—O group and a P═O group. Examples of such as a phosphorus-containing group include a phosphonic acid group, a phosphinic acid group, a phosphorous acid group, a phosphite group, a phosphate group, a diphosphate group, a triphosphate group, and a pyrophosphate group. As a surface-treated pigment, when a surface-treated pigment having a phosphorus-containing group on a surface is used, a water-based ink composition which is excellent in the storage stability obtained, and the permeability of the ink to the recording medium and the affinity with the recording medium are improved, and it is possible to obtain a recorded material which is more excellent in the image quality and the abrasion resistance.

Examples of the sulfonyl group include —$SO_3M$, —$SO_2NH_3$, —$RSO_3M$, and —$SO_3NHCOR$, examples of the carbonyl group include —OM, —COOM, and —CO—, and examples of other hydrophilic groups include —$NH_3$ and —$NR_3$ (here, M in the formula represents a hydrogen atom, alkali metal, ammonium, or organic ammonium, and R represents an alkyl group having 1 to 12 carbon atoms and a phenyl group which may have a substituent or a naphthyl group which may have a substituent).

These functional groups are introduced physically and/or chemically by being grafted to the pigment particle surface directly and/or via other groups. Examples of other groups include an alkylene group having 1 to 12 carbon atoms, a phenylene group which may have a substituent, or a naphthylene group which may have a substituent.

In addition, as the surface-treated pigment, it is preferable to use a pigment which is surface-treated such that —$SO_3M$ and/or —$RSO_3M$ (M is a counter ion, and represents a hydrogen ion, an alkali metal ion, an ammonium ion, or an organic ammonium ion) is chemically bonded to the pigment particle surface by a treating agent containing sulfur, that is, a pigment which is dispersed in a solvent having no active protons, no reactivity with a sulfonic acid, and in which the pigment is insoluble or hardly soluble, then is surface-treated such that —$SO_3M$ and/or —$RSO_3M$ is chemically bonded to the particle surface by an amidosulfuric acid or a complex of sulfur trioxide and a tertiary amine, and thus can be dispersed and/or dissolved in water.

As a surface treatment unit that grafts the functional group or the salt thereof on the surface of the pigment particle directly or via a polyvalent group, various known surface treatment units can be applied. Examples thereof include a unit that causes ozone or a sodium hypochlorite solution to act on commercially available oxidized carbon black, and further oxidizes the carbon black so as to treat the surface more hydrophilic (for example, JP-A-7-258578, JP-A-8-3498, JP-A-10-120958, JP-A-10-195331, JP-A-10-237349), a unit that treats carbon black with 3-amino-N-alkyl substituted pyridium bromide (for example, JP-A-10-195360 and JP-A-10-330665), a unit for dispersing an organic pigment in a solvent in which the organic pigment is insoluble or poorly soluble and introducing a sulfone group into the pigment particle surface with a sulfonating agent (for example, JP-A-8-283596, JP-A-10-110110, and JP-A-10-110111), and a unit for dispersing an organic pigment in a basic solvent which forms a complex with sulfur trioxide by treating the surface of the organic pigment by adding sulfur trioxide, and introducing a sulfone group or sulfonamino group (for example, JP-A-10-110114); however, units for preparing the surface-treated pigment used in the invention is not limited thereto.

The functional group to be grafted to one pigment particle may be single or plural. The kind and degree of the grafted functional group may be appropriately determined in consideration of dispersion stability in the ink, color density, dryability on the front surface of the ink jet head, and the like.

Examples of the resin dispersant include polyvinyl alcohols, polyvinyl pyrrolidones, a polyacrylic acid, an acrylic acid-acrylonitrile copolymer, a vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, and a vinyl acetate-acrylic acid copolymer, and salts thereof. Among them, a copolymer of a monomer having a hydrophobic functional group and a monomer having a hydrophilic functional group, and a polymer consisting of a monomer having both of the hydrophobic functional group and the hydrophilic functional group are particularly preferable. As a form of the copolymer, any of a random copolymer, a block copolymer, an alternating copolymer, and a graft copolymer can be used.

Examples of the salt include a basic compound such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, and morpholine, and a salt. The additional amount of these basic compounds is not particularly limited as long as it is not less than the neutralization equivalent of the resin dispersant.

A molecular weight of the resin dispersant as a weight average molecular weight is preferably in a range of 1,000 to 100,000, and is further preferably in a range of 3,000 to 10,000. When the molecular weight is within the above range, stable dispersion of the coloring material can be obtained in water and it is easy to perform viscosity control when the coloring material is applied to the ink composition.

As the above-mentioned resin dispersant, commercially available products can also be used. Specifically, examples thereof include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240) (product names, manufactured by BASF Japan Ltd).

Examples of the surfactant include an anionic surfactant such as alkanesulfonate, α-olefin sulfonate, alkyl benzene sulfonate, alkyl naphthalene sulfonate, acyl methyl taurate, dialkyl sulfosuccinate, alkyl sulfate ester salt, sulfated olefin, polyoxyethylene alkyl ether sulfate ester salt, alkyl phosphate ester salt, polyoxyethylene alkyl ether phosphoric acid ester salt, and monoglycerite phosphate ester salt; an amphoteric surfactant such as alkyl pyridium salt, alkyl amino acid salt, and alkyl dimethyl betaine; and a nonionic surfactant such as polyoxyethylene alkyl ether, polyoxyethylene alkyl phenyl ether, polyoxyethylene alkyl ester, polyoxyethylene alkyl amide, glycerin alkyl ester, and sorbitan alkyl ester.

The content of the surface-treated pigment contained in the water-based ink composition is preferably in a range of 0.5% by mass to 15% by mass, is further preferably in a range of 1% by mass to 12% by mass, is still further preferably in a range of 1% by mass to 9% by mass, and is particularly preferably in a range of 2% by mass to 6% by mass with respect to the total mass (100% by mass) of the water-based ink composition. When the content of the surface-treated pigment is within the above range, the discharge stability at the recording is secured and an image which is excellent in the image quality and the abrasion resistance can be formed.

The additional amount of the pigment of the resin dispersant or the surfactant is preferably in a range of 1 part by mass to 100 parts by mass, is further preferably in a range of 5 parts by mass to 50 parts by mass, with respect to 100 parts by mass of pigment. When the additional amount is within the above range, it is possible to secure the dispersion stability of the pigment in water.

The above-described surface-treated pigment is dispersed in water so as to be used as a pigment dispersion. The method of dispersing the resin dispersed pigment, the surfactant dispersed pigment, and the surface-treated pigment in water can be performed by adding a pigment, water, and a resin dispersant as the resin dispersed pigment, adding a pigment, water, and a surfactant as the surfactant dispersed pigment, adding a surface-treated pigment and water as the surface-treated pigment, and adding a water-soluble organic solvent or a neutralizing agent to each of the pigments as necessary, with a conventionally used dispersing machine such as a ball mill, a sand mill, an attritor mill, a roll mill, an agitator mill, a Henschel mixer, a colloid mill, an ultrasonic homogenizer, a jet mill, and an angmill. In this case, from the viewpoint of securing the dispersion stability of the pigment in water, it is preferable that the resin dispersed pigment is dispersed such that a particle diameter of the pigment is in a range of 20 nm to 500 nm, and is further preferably in a range of 50 nm to 200 nm at an average particle diameter. The same is true for the case where the resin dispersant and the surfactant are used.

1.2.2. Water

The water-based ink composition used in the embodiment contains water. Water is a main medium of the water-based ink composition and is a component that evaporates and scatters by heating. Water is preferably obtained by removing ionic impurities such as pure water of ion-exchanged water, ultrafiltered water, reverse osmosis water, and distilled water, or ultrapure water as much as possible. When water sterilized by ultraviolet irradiation or addition of hydrogen peroxide is used, the generation of mold and bacteria can be suppressed in a case where the pigment dispersion and the ink composition using the pigment dispersion is stored for a long time, which is preferable.

The content of the water is preferably equal to or greater than 40% by mass, is further preferably equal to or greater than 50% by mass, is still further preferably equal to or greater than 60% by mass, and is particularly preferably equal to or greater than 70% by mass, with respect to the total mass (100%) of the water-based ink composition.

1.2.3. Resin Fine Particles

The water-based ink composition used in the embodiment preferably contains the resin fine particles in which the resin is dispersed in water (that is, in an emulsion state or a suspension state). The resin component of the resin fine particles has a function of solidifying ink and firmly fixing the ink solidified on the recording medium, and particularly, the image recording on the recording medium having non-ink absorbability or low ink absorbability has the improved abrasion resistance.

The resin of the resin fine particles is not particularly limited, and examples thereof include a homopolymer or a copolymer of a (meth)acrylic acid, (meth)acrylate ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, a fluorine resin, and a natural resin. Among them, an acrylic resin which is a homopolymer or copolymer of at least one of (meth)acrylic monomers such as (meth)acrylic acid, (meth)acrylic acid ester, acrylonitrile, and cyanoacrylate is preferable. Among the acrylic resins, a copolymer of a (meth)acrylic monomers and a vinyl monomer is preferable. The vinyl monomer is not particularly limited, and examples thereof include styrene. A styrene-acrylic copolymer type resin which is a copolymer of a (meth)acrylic monomer and styrene is particularly preferable. The above-described copolymer may be in any form of a random copolymer, a block copolymer, an alternating copolymer, and a graft copolymer. As the resin, in addition to the above, a polyurethane resin, a polyester resin, and a polyether resin are also preferable, and particularly among them, as the resin of the resin fine particles, it is preferable to use an acrylic resin, a polyurethane resin, and a polyester resin.

When the water-based ink composition used in the embodiment contains a predetermined resin as the resin of the resin fine particles, it is possible to record an image excellent in the image quality and the abrasion resistance, and also to obtain the dispersion stability of the resin fine particles, and thus it is possible to secure the discharge stability at the time of recording.

The molecular weight of the resin of the resin fine particles is preferably in a range of 10,000 to 100,000, is further preferably in a range of 20,000 to 80,000, and is still further preferably in a range of 30,000 to 70,000.

The above resin is not particularly limited, and it can be obtained by, for example, the following preparing method, and a plurality of methods may be combined as necessary. Examples of the preparing method include a method of mixing and polymerizing a polymerization catalyst (a polymerization initiator) and a dispersant in a monomer of the component constituting a desired resin, and polymerizing (that is, emulsion polymerization), a method of dissolving a resin having a hydrophilic portion in a water-soluble organic solvent, then mixing the solution in water, and removing the water-soluble organic solvent by distillation or the like, and a method of dissolving a resin in a water-insoluble organic solvent, and mixing the solution with an dispersant in an aqueous solution.

The average particle diameter of the above resin is preferably in a range of 10 nm to 500 nm, is further preferably in a range of 20 nm to 400 nm, and is particularly preferably in a range of 30 nm to 300 nm. When the average particle diameter of the resin is within the above-described range, the film formability becomes excellent, and large agglomerates are difficult to form even the resin agglomerate, and thus the nozzle clogging can be reduced. The average particle diameter in this specification is on a volume basis unless otherwise specified. As a measuring method, for example, it can be measured by a particle size distribution measuring apparatus using dynamic light scattering theory as a measurement principle. Examples of such a particle size distribution measuring apparatus include "Microtrack UPA" manufactured by Nikkiso Co., Ltd.

The content of the resin fine particles is preferably in a range of 2% by mass to 20% by mass, is further preferably in a range of 3% by mass to 15% by mass, and is particularly preferably in a range of 4% by mass to 10% by mass with respect to the total mass (100% by mass) of the ink composition in terms of the solid content. When the content of the solid content of the resin fine particles is within the above range, the discharge stability at the recording is secured and an image which is excellent in the image quality and the abrasion resistance can be formed.

1.2.4. Organic Solvent

The water-based ink composition used in the embodiment may contain an organic solvent. When the ink composition contains the organic solvent, the water-based ink composition discharged on the recording medium becomes wet and spreads and the dryability becomes excellent, and thereby it is possible to obtain a recorded material which has the excellent image quality and the abrasion resistance.

The organic solvent used for the ink composition is preferably a water-soluble organic solvent. By using the water-soluble organic solvent, the water-based ink composition is stably dispersed and the ink composition has more excellent dryability, and thereby it is possible to obtain a recorded material excellent in the water resistance and the abrasion resistance.

The organic solvent is not particularly limited, and examples thereof include alcohols such as methanol, ethanol, and isopropyl alcohol; ketones or ketoalcohols such as acetone and diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether, and diethylene glycol monobutyl ether; amines having a hydroxyl group such as diethanolamine and triethanolamine; and glycerin. Among them, from the aspect of improving the dryability of the water-based ink composition, propylene glycol, 1,2-hexanediol, 1,3-butanediol, and the like are preferably used.

In addition, in the embodiment, as the organic solvent used for the water-based ink composition, it is preferable to include a cyclic amide compound from the aspect of obtaining a recorded material excellent in water resistance and abrasion resistance. As the cyclic amide compound, more specific examples of the nitrogen-containing solvent include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The cyclic amide compound acts as a dissolving agent good for a thermoplastic resin.

The content of the organic solvent is preferably in a range of 0.5% by mass to 45% by mass, is further preferably in a range of 1% by mass to 35% by mass, and is particularly preferably in a range of 2% by mass to 30% by mass with respect to the total mass (100% by mass) of the water-based ink composition.

The standard boiling point of the organic solvent is preferably equal to or higher than 180° C., is further preferably equal to or higher than 200° C., and is still further preferably equal to or higher than 220° C. The upper limit of the standard boiling point of the organic solvent is preferably equal to or lower than 300° C., is further is preferably equal to or lower than 270° C., and is still further preferably equal to or lower than 250° C. When the standard boiling point of the organic solvent is within the above range, the discharge stability and the abrasion resistance are more excellent, which is preferable.

Note that, the organic solvent having the standard boiling point which is equal to or higher than 280° C. absorbs moisture of the ink to thicken the ink in the vicinity of the ink jet head in some cases, and with this, the discharge stability of the ink jet head may be deteriorated. For this reason, in the embodiment, in the water-based ink composition, the content of the organic solvent having the standard boiling point of equal to or higher than 280° C. is preferably equal to or less than 3% by mass, is further preferably equal to or less than 2% by mass, is still further preferably equal to or less than 1% by mass, is still further preferably equal to or less than 0.5% by mass, and is still further preferably equal to or less than 0.1% by mass. In this case, the dryability of the ink composition on the recording medium is improved, and thus it is possible to form an excellent image in which the occurrence of bleeding is suppressed. In addition, stickiness of the obtained recorded material is reduced, and the water resistance and the abrasion resistance become excellent.

Examples of the organic solvent having a standard boiling point of equal to or higher than 280° C. include glycerin. Since the glycerin has high hygroscopicity and high standard boiling point, clogging of the ink jet head and malfunction may be caused in some cases. In addition, the glycerin is lack of the antiseptic properties, is likely to cause molds and fungi to propagate, and thus is preferably not to be included in the ink composition.

1.2.5. Surfactant

In the embodiment, the water-based ink composition may contain a surfactant. The surfactant reduces the surface tension of the ink, and thus has a function of improving the wettability of the recording medium. Among the surfactants, for example, an acetylene glycol-based surfactant, as a silicon-based surfactant, a fluorine-based surfactant, and the like can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D, OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (which are all product names, prepared by Nissin Chemical Industry CO., Ltd), and ACETYLENOL E00, E00P, E40, E100 (which are all product names, prepared by Kawaken Fine Chemical Co., Ltd).

The silicon-based surfactant is not particularly limited, and a polysiloxane compound is preferably exemplified. The polysiloxane compound is not particularly limited, and examples thereof include polyether-modified organosiloxane. Examples of the commercially available polyether-modified organosiloxane include BYK-306, BYK-307, BYK-333, BYK-341, BYK-345, BYK-346, and BYK-348 (which are product names, prepared by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are product names, prepared by Shin-Etsu Chemical Co., Ltd).

As the fluorine-based surfactant, a fluorine-modified polymer is preferably used, and specific examples thereof include BYK-340 (prepared by BYK Japan KK).

In a case of containing a surfactant, the content thereof is preferably in a range of 0.1% by mass to 8% by mass, is further preferably in a range of 0.25% by mass to 6% by mass, and is still further preferably in a range of 0.5% by mass to 4% by mass with respect to the total mass (100% by mass) of the water-based ink composition. When the content of the surfactant is within the above range, the discharge stability, the image quality, and the abrasion resistance are improved.

1.2.6. Other Containing Components

In the water-based ink composition used in the embodiment, in order to maintain good storage stability and discharge stability from the head, and to improve clogging or to prevent deterioration of the ink, various additives such as a defoaming agent, a dissolution aid, a viscosity adjuster, a pH adjuster, antioxidant, an antiseptic agent, a mildewproofing agent, a corrosion inhibitor, and a moisturizer which is not an organic solvent, and a chelating agent for capturing metal ions affecting dispersion may be appropriately added as needed.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium bicarbonate.

Examples of the antiseptic or mildewproofing agent include sodium benzoate, sodium pentachlorophenol, sodium 2-pyridinethiol-1-oxide, sodium sorbate, sodium dehydroacetate, and 1,2-dibenzisothiazolin-3-one. As a commercially available product, Proxel XL2 and Proxel GXL (product name, prepared by Avecia) and, Denicide CSA and NS-500W (product names, prepared Nagase Kem made Tex Co., Ltd).

Examples of the rust preventive agent include benzotriazole.

Examples of the chelating agent include an ethylenediaminetetraacetic acid and salts thereof (such as ethylenediaminetetraacetic acid dihydrogen disodium salt).

Examples of the moisturizer which is not the organic solvent include a moisturizer of a solid at normal temperature such as trimethylolpropane and sugar.

1.2.7 Method of Preparing Water-Based Ink Composition

In the embodiment, the water-based ink composition can be obtained by mixing the above-mentioned components in an arbitrary order, and filtering or the like as necessary so as to remove impurities. As a method of mixing the respective components, a method in which materials are sequentially added into a container equipped with a stirring device such as a mechanical stirrer and a magnetic stirrer, and stirring and mixing the materials is suitably used. As a filtration method, centrifugal filtration, filter filtration, and the like can be performed as necessary.

1.2.8. Physical Properties of Water-Based Ink Composition

In the embodiment, in the water-based ink composition, a surface tension at 20° C. is preferably in a range of 18 mN/m to 40 mN/m, is further preferably in a range of 20 mN/m to 35 mN/m, and is still further preferably in a range of 22 mN/m to 33 mN/m from the viewpoint of balance between the image quality and reliability as ink for ink jet recording. The measurement of the surface tension can be performed, for example, by confirming the surface tension when a platinum plate is wet with ink in an environment of 20° C. using an automatic surface tensiometer CBVP-Z (product name, manufactured by Kyowa Interface Science Co., Ltd).

In addition, from the same viewpoint, the viscosity at 20° C. of the water-based ink composition used in the embodiment is preferably in a range of 3 mPa·s to 10 mPa·s, and is further preferably in a range of 3 mPa·s to 8 mPa·s. Note that, the measurement of the viscosity can be performed by measuring the viscosity in an environment of 20° C. using a viscoelasticity testing machine MCR-300 (product name, manufactured by Pysica, Inc).

In addition, in the embodiment, the water-based ink composition has conductivity which is preferably in a range of 500 μs/cm to 3100 μs/cm, is further preferably in a range of 850 μs/cm to 2800 μs/cm, and is still further preferably in a range of 1000 μs/cm to 2500 μs/cm. When the conductivity of the ink composition is within the above range, it is possible to provide a water-based ink composition which is excellent in the dispersion stability of the ink component and storage stability. In addition, when the conductivity of the ink composition is within the above range, it is possible to obtain ink which is excellent in the discharge stability.

The lower limit of the conductivity is equal to or greater than 0 μs/cm, and is not particularly limited. For example, it is preferably equal to or greater than 100 μs/cm, is further preferably equal to or greater than 500 μs/cm, is still further preferably equal to or greater than 700 μs/cm, is even still preferably equal to or greater than 850 μs/cm, and is particularly preferably equal to or greater than 1000 μs/cm. In addition, the upper limit of the conductivity of the ink composition is preferably equal to or less than 3100 μs/cm, is further preferably equal to or less than 2800 μs/cm, and is still further preferably equal to or less than 2500 μs/cm. When the conductivity of the ink composition is within the above range, it is possible to obtain a water-based ink jet ink composition which is excellent in the discharge stability and the storage stability.

Note that, the conductivity of the ink composition can be measured by using a conductivity meter (EC Tester 11+, manufactured by Eutech Instruments).

The conductivity of the ink composition can be adjusted by adjusting, for example, the kinds of the components having the conductivity among the components contained in the ink composition or adjusting the content in the ink composition. Examples of the component having the conductivity include a pigment dispersion, and resin fine particles. The conductivity of the pigment dispersant can be adjusted by adjusting degree of the treatment at the time of performing the surface treatment of introducing an ionic functional group on the surface of the pigment dispersion, or adjusting the amount of the ionic functional group having a resin dispersant using the pigment dispersion. The conductivity of the resin fine particles can be adjusted by adjusting the amount of the ionic functional group having a resin constituting the resin fine particles, or adjusting the amount of the ionic functional group possessed by dispersant used for dispersing the resin fine particles. Examples of the component having the conductivity include other compounds having an ionic functional group.

1.3 Reaction Solution

Next, the reaction solution used in the ink jet recording method according to the embodiment will be described. The reaction solution used in the embodiment contains an aggregating agent for aggregating the component of the water-based ink composition. Hereinafter, the components which can be contained in the reaction solution used in the embodiment will be specifically described.

Note that, in the reaction solution of the embodiment, the content of the coloring material is equal to or less than 0.2% by mass, is not the water-based ink composition used for coloring the recording medium, but is an auxiliary liquid used to be attached to the recording medium before the water-based ink composition is attached to the recording medium.

1.3.1. Aggregating Agent

The reaction solution used in the embodiment contains an aggregating agent for aggregating the component of the water-based ink composition. When the reaction solution contains an aggregating agent, in an ink composition attaching step described below, the aggregating agent and the resin contained in the water-based ink composition rapidly react with each other. Then, the dispersed state of the pigment and the resin in the ink composition is destroyed, and the pigment and the resin aggregate. In addition, since this agglomerate inhibits the penetration of the pigment into the recording medium, it is considered that the ink is fixed early so as to suppress bleeding and to improve the image quality of the recorded image. On the other hand, when the reaction solution contains the aggregating agent, the abrasion resistance, there is a problem in that the wet abrasion resistance, and the glossiness of the recorded material, and the discharge stability of the ink are deteriorated; however, this problem is solved by the ink jet recording method according to the embodiment described below.

Examples of the aggregating agent include a polyvalent metal salt, a cationic compound (a cationic resin, a cationic surfactant, and the like), and an organic acid. These aggregating agents may be used alone or two or more kinds thereof may be used in combination. Among these aggregating agents, it is preferable to use at least one aggregating agent selected from the group consisting of a polyvalent metal salt and an organic acid from the viewpoint of excellent reactivity with the resin contained in the ink composition.

The polyvalent metal salt is a compound that is composed of a polyvalent metal ion having two or more valences and an anion binding to these polyvalent metal ions and is soluble in water. Specific examples of the polyvalent metal ion include a divalent metal ion such as $Ca^{2+}$, $Cu^{2+}$, $Ni^{2+}$, $Mg^{2+}$, $Zn^{2+}$, and $Ba^{2+}$; $Al^{3+}$, and $Fe^{3+}$; and a trivalent metal ion such as $Cr^{3+}$. Examples of the anion include $Cl^-$, $I^-$, $Br^-$, $SO_4^{2-}$, $ClO^{3-}$, $NO^{3-}$, $HCOO^-$, and $CH_3COO^-$. Among these polyvalent metal salts, a calcium salt and a magnesium salt are preferable from the viewpoint of the stability of the reaction solution and the reactivity as an aggregating agent.

Preferable examples of the organic acid include a sulfuric acid, a hydrochloric acid, a nitric acid, a phosphoric acid, a polyacrylic acid, an acetic acid, a glycolic acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrrolidone carboxylic acid, a pyrone carboxylic acid, a pyrrole carboxylic acid, a furancarboxylic acid, a pyridine carboxylic acid, a coumaric acid, an thiophencarboxylic acid, a nicotinic acid, and derivatives of these compounds, or salts thereof. The organic acid may be used alone or two or more kinds thereof may be used in combination.

Examples of the cationic resin include a cationic urethane resin, a cationic olefin resin, and a cationic-based allylamine resin.

As the cationic urethane resin, known ones can be appropriately selected and used. As the cationic urethane resin, a commercially available product can be used, and examples thereof include HYDRAN CP-7010, CP-7020, CP-7030, CP-7040, CP-7050, CP-7060, and CP-7610 (which are product name, prepared by DIC Corporation), SUPER FLEXs 600, 610, 620, 630, 640, and 650 (which are product name, prepared by DAI-ICHI KOGYO SEIYAKU Co., Ltd.), and urethane emulsion WBR-2120C and WBR-2122C (product name, prepared by TAISEI FINE CHEMICAL Co., Ltd).

The cationic olefin resin has olefin such as ethylene and propylene as a structural skeleton, and the well-known resins can be appropriately selected to be used. Also, the cationic olefin resin may be in an emulsion state which the resin is dispersed in a solvent including water or an organic solvent. As the cationic olefin resin, commercially available products can be used, and the examples thereof include Arrowbase CB-1200 and CD-1200 (product name, prepared by UNITIKA Ltd).

As the cationic allylamine-based resin, the well-known resins can be appropriately selected to be used, and the examples thereof include poly allylamine hydrochloride, poly allylamine amide sulfate, an allylamine hydrochloride diallylamine hydrochloride copolymer, an allylamine acetate diallylamine acetate copolymer, an allylamine acetate diallylamine acetate copolymer, an allylamine hydrochloride dimethyl allylamine hydrochloride copolymer, an allylamine dimethyl allylamine copolymer, polydiallylamine hydrochloride, polymethyl diallylamine hydrochloride, polymethyl diallylamine amide sulfate, polymethyl diallylamine acetate, polydiallyl dimethyl ammonium chloride, a diallylamine acetate sulfur dioxide copolymer, a diallyl methylethyl ammonium ethyl sulfate sulfur dioxide copolymer, a methyldiallylamine hydrochloride sulfur dioxide copolymer, a diallyldimethyl ammonium chloride sulfur dioxide copolymer, and a diallyldimethyl ammonium chloride acrylamide copolymer. As the cationic allylamine-based resin, commercially available products can be used, and the examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (product name, prepared by NITTOBO MEDICAL CO., LTD.), HYMO Neo-600, HYMOLOC Q-101, Q-311, and Q-501, HIMAX SC-505, and SC-505 (product name, prepared by HYMO Co., Ltd).

Examples of the cationic surfactant include primary, secondary, and tertiary amine salt-type compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. The specific examples of the cationic surfactant include hydrochlorides or acetates of laurylamine, coconut-type amine, rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridiniumbromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The concentration of the aggregating agent of the reaction solution may be equal to or greater than 0.03 mol/kg in 1 kg of the reaction solution. In addition, in 1 kg of the reaction solution, the concentration of the aggregating agent of the reaction solution may be in a range of 0.1 mol/kg to 1.5 mol/kg, and may be in a range of 0.2 mol/kg to 0.9 mol/kg.

In addition, the content of the aggregating agent of the reaction solution is, for example, preferably in a range of 1% by mass to 15% by mass, is further preferably in a range of 1% by mass to 10% by mass, is still further preferably in a range of 2% by mass to 7% by mass, and is particularly preferably in a range of 3% by mass to 6% by mass with respect to the total mass (100% by mass) of the reaction solution. When the content of the aggregating agent of the reaction solution is within the above range, a coating amount of the reaction solution for coating the recording medium with appropriate amount of the aggregating agent becomes appropriate, and thus it is possible to uniformly coat the surface of the recording medium. In addition, the coating amount of the reaction solution is set to be appropriate, less time and heating energy are required for drying the reaction solution. Further, it is possible to improve the discharge stability of the reaction solution.

1.3.2. Water

Water preferably functions as a main solvent of the reaction solution used in the embodiment. The water is a component that is evaporated and dispersed by drying after attaching the reaction solution to the recording medium. As the water, pure water such as ion-exchanged water, ultrafiltered water, reverse osmosis water, and distilled water, or water from which ionic impurities are completely removed such as ultrapure water is preferable. In addition, when water sterilized by ultraviolet irradiation or addition of hydrogen peroxide is used, it is possible to prevent generation of molds or bacteria in a case where the reaction solution is stored for a long period of time, which is preferable. The content of the water contained in the reaction solution can be equal to or greater than 40% by mass, is preferably equal to or greater than 50% by mass, is further preferably equal to or greater than 55% by mass, and is still further preferably equal to or greater than 65% by mass, with respect to the total mass (100% by mass) of the reaction solution.

1.3.3. Organic Solvent

The reaction solution used in the embodiment may contain an organic solvent. When the organic solvent is contained, it is possible to improve the wettability of the reaction solution with respect to the recording medium. As the organic solvent, it is possible to use the same one as the organic solvent exemplified as the above-described water-based ink composition. The content of the organic solvent is not particularly limited, and for example, it can be in a range of 10% by mass to 80% by mass, and is preferably in a range of 15% by mass to 70% by mass with respect to the total mass (100% by mass) of the reaction solution.

The standard boiling point of the organic solvent may be contained independently from the standard boiling point of the organic solvent which may be contained in the ink composition in the temperature of the preferred range of the standard boiling point of the organic solvent which may be contained in the ink composition described above. Alternatively, the standard boiling point of the organic solvent is preferably equal to or higher than 180° C., is further preferably in a range of 180° C. to 300° C., is still further preferably in a range of 190° C. to 270° C., and is particularly preferably in a range of 200° C. to 250° C.

Note that, similar to the above-described water-based ink composition, in the reaction solution, as the organic solvent, the content of the water-soluble organic solvent having the standard boiling point of higher than 280° C. is preferably equal to or less than 5% by mass, is further preferably equal to or less than 3% by mass, is still further preferably equal to or less than 2% by mass, is still further preferably equal to or less than 1% by mass, and is still further preferably equal to or less than 0.5% by mass. In this case, the dryability of the reaction solution is excellent, and thus the drying of the reaction solution is rapidly performed, and reduction of stickiness and the abrasion resistance of the obtained recorded material are also excellent.

1.3.4. Surfactant

The reaction solution used in the embodiment may contain a surfactant. By containing the surfactant, the surface tension of the reaction solution is decreased, and thereby it is possible to improve the wettability with respect to the recording medium. Among the surfactants, for example, an acetylene glycol-based surfactant, a silicone-based surfactant, and a fluorine-based surfactant may be preferably used. As specific examples of these surfactants, the same surfactant as exemplified in the water-based ink composition described later can be used. The content of the surfactant is not particularly limited, and can be set to be in a range of 0.1% by mass to 5% by mass with respect to the total mass (100% by mass) of the reaction solution.

1.3.5. Other Components

The reaction solution used in the embodiment, as necessary, may contain a pH adjuster, an antiseptic or mildewproofing agent, a rust preventive agent, a chelating agent, and the like.

1.3.6. Preparing Method of Reaction Solution

The reaction solution used in the embodiment can be prepared by dispersing and mixing the above-described components using an appropriate method. After thoroughly stirring each of the above components, filtration is performed in order to remove coarse particles and foreign matters which cause clogging, and thereby a desired reaction solution can be obtained.

1.3.7. Physical Properties of Reaction Solution

In a case where the reaction solution used in the embodiment is discharged by using an ink jet head, the surface tension at a temperature of 20° C. is preferably in a range of 18 mN/m to 40 mN/m, is further preferably in a range of 20 mN/m to 35 mN/m, and is still further preferably in a range of 22 mN/m to 33 mN/m. The surface tension can be measured by, for example, confirming the surface tension when a platinum plate is wet by the reaction solution in an environment of 20° C., using an automatic surface tensiometer CBVP-Z (product name, manufactured by Kyowa Interface Science Co., Ltd).

In addition, from the same viewpoint, the viscosity of the reaction solution used in the embodiment at a temperature of 20° C. is preferably in a range of 3 mPa·s to 10 mPa·s, and is further preferably in a range of 3 mPa·s to 8 mPa·s. Note that, the measurement of the viscosity can be performed by measuring the viscosity in an environment of 20° C. using a viscoelasticity testing machine MCR-300 (manufactured by Pysica, Inc).

1.4. Recording Medium

The above-described water-based ink composition has the dryability of the ink, and is used with the reaction solution, and thus it is possible to obtain an image excellent in the image quality and the abrasion resistance in the recording of the recording medium having ink absorbability, non-ink absorbability, or low ink absorbability. Particularly, in the recording of the recording medium having non-ink absorbability or low ink absorbability, it is possible to obtain an image excellent in the image quality and the abrasion resistance, and the image can be preferably used.

Examples of the recording medium having the ink absorbability include fabrics such as cotton, silk, polyester, polyurethane, and nylon with high ink absorbability, plain paper, exclusive paper for ink jet, high quality paper with medium absorbability, and copy paper.

Examples of the recording medium having non-ink absorbability include a medium to which a plastic film which is not subjected to a surface treatment for ink jet recording (that is, no ink absorbing layer is formed), a medium to which plastic is coated on a base material such as paper, and a medium to which a plastic film is bonded. Examples of the plastic herein include polyvinyl chloride, polyethylene terephthalate, polycarbonate, polystyrene, polyurethane, polyethylene, and polypropylene. Examples of the recording medium having low ink absorbability include printing paper such as art paper, coated paper, and mat paper. Note that, in the present specification, the recording medium having non-ink absorbability or low ink absorbability is also simply referred to as "plastic media".

Here, in the present specification, the "recording medium having non-ink absorbability or low ink absorbability" means "recording medium of which the water absorption amount is equal to or less than 10 mL/m$^2$ within 30 msec$^{1/2}$ from the start of contacting a liquid according to Bristow method". The Bristow method is most widely used as a method for measuring the liquid absorption amount in a short period of time, and has been adopted by Japan Technical Association of the Pulp and Paper Industry (Japan TAPPI). The details of the testing method are described in the standard No. 51 "Paper and Paperboard-liquid absorbability testing method-Bristow method" of the "JAPAN TAPPI paper and pulp testing method 2000 version".

Examples of the recording medium having non-ink absorbability include a medium in which a base material such as a plastic film having no ink absorbing layer and paper is coated with plastic, and a medium to which plastic is coated on paper, and a medium to which a plastic film is bonded. Examples of the plastic herein include polyvinyl chloride, polyethylene terephthalate, polycarbonate, polystyrene, polyurethane, polyethylene, and polypropylene.

Examples of the recording medium having low ink absorbability include a recording medium provided with a coating layer for receiving an ink on the surface thereof. As the paper base material, for example, printing paper such as art paper, coated paper, and mat paper can be exemplified. In a case where the base material is a plastic film, the examples thereof include a film of which the surface such as polyvinyl chloride, polyethylene terephthalate, polycarbonate, polystyrene, polyurethane, polyethylene, and polypropylene is coated with a hydrophilic polymer, and a film coated with particles such as silica and titanium, and a binder. These recording media may be transparent recording media.

In addition, the recording medium having non-ink absorbability or low ink absorbability which has surface unevenness, such as embossed media, can be preferably used as well.

In a case where the ink jet recording apparatus 1 is a serial type (multi-pass type) recording apparatus, the width of the recording medium is preferably equal to or less than 3.2 m. In this case, the time during which the recording medium faces the ink jet head 2 during one main scanning, that is, the time that nozzles 22 which are not used during one main scanning receive heat from recording medium is equal to or shorter than 12 seconds, it is possible to suppress the drying of the ink composition in the nozzle and composition variation thereof in the ink, and it is possible to reduce welding of the resin to an inner wall of the nozzle. As a result, the landing deviation of ink at the time of continuous printing can be suppressed, and the clogging recoverability of the nozzle 22 is improved, and the discharge stability is improved as well. Note that, the lower limit of the preferable width of the recording medium is equal to or greater than 30 cm.

2. Ink Jet Recording Method

The ink jet recording method according to the embodiment includes a reaction solution attaching step of attaching a reaction solution which contains an aggregating agent for aggregating a component of a water-based ink composition to a recording region of a recording medium, and an ink composition attaching step of attaching a water-based ink composition which contains a pigment dispersion containing a surface-treated pigment and water to the recording region of the recording medium by discharging the water-based ink composition from an ink jet head, in which the recording region includes a region in which an attachment amount of the water-based ink composition is in a range of 2 times to 20 times the attachment amount of the reaction solution. Hereinafter, the ink jet recording method according to the embodiment will be described with reference to the drawings.

2.1. Reaction Solution Attaching Step

The reaction solution attaching step is a step of attaching the reaction solution which contains an aggregating agent for aggregating a component of a water-based ink composition to the recording region of the recording medium. When the reaction solution is attached to the recording medium, it is possible to improve the abrasion resistance and the image quality.

The reaction solution attaching step may be performed before attaching the water-based ink composition, may be performed after attaching the water-based ink composition, or may be performed at the same time of the attaching of the water-based ink composition. In the case where the reaction solution is attached before attaching the water-based ink composition, the recording medium M is preferably heated by the preheater 7 as illustrated in FIG. 1 before the reaction solution attaching step, or at the time of the reaction solution attaching step, heated by the IR heater 3 or the platen heater 4 as illustrated in FIG. 1. When the reaction solution is attached onto the heated recording medium M, the reaction solution discharged to the recording medium M more easily spreads on the recording medium M, and the recording medium M can be uniformly coated with the reaction solution. For this reason, the ink attached in the ink composition attaching step described below and the reaction solution sufficiently react with each other so that excellent image quality can be obtained. In addition, the recording medium M is uniformly coated with the reaction solution, and thus it is possible to reduce the coating amount, and to prevent the abrasion resistance of the obtained image from being deteriorated.

Here, the surface temperature of the recording medium M at the time of attaching the reaction solution can be set independently from the preferable range of the surface temperature (primary heating temperature) of the recording medium M at the time of attaching ink described below. For example, the surface temperature of the recording medium M at the time of attaching the reaction solution is preferably equal or lower than 45° C., is further preferably equal or lower than 40° C., and is still further preferably equal or lower than 38° C. In addition, the lower limit of the surface temperature of the recording medium M at the time of attaching the reaction solution is preferably equal to or higher than 30° C., and is further preferably equal to or higher than 32° C. In a case where the surface temperature of the recording medium M at the time of attaching the reaction solution is within the above range, it is possible to uniformly coat the reaction solution on the recording medium M, and to improve the abrasion resistance and the image quality. In addition, it is possible to prevent the ink jet head 2 from being affected by heat.

Note that, as described above, in the embodiment, the recording region includes a region in which the attachment amount of the water-based ink composition is in a range of 2 times to 20 times the attachment amount of the reaction solution.

In the above area, in order to set such a value, the attachment amount of the reaction solution is preferably equal to or less than 3.0 mg/inch$^2$, is further preferably equal to or less than 2.5 mg/inch$^2$, is still further preferably equal to or less than 1.5 mg/inch$^2$, and is particularly preferably equal to or less than 1.3 mg/inch$^2$. In addition, the lower limit of the attachment amount of the reaction solution in the above area is preferably equal to or greater than 0.5 mg/inch$^2$, is further preferably equal to or greater than 0.7 mg/inch$^2$, and is still further preferably equal to or greater than 0.8 mg/inch$^2$. With the above-described value, it is possible to obtain the excellent image quality, the ink discharge stability, and the wet abrasion resistance, and the glossiness and the wet abrasion resistance are also excellent.

Note that, the attachment of the reaction solution may be performed by discharging by using the ink jet head 2, and examples of the attaching method include a method of coating the recording medium with reaction solution by using a rolling coater, and a method of ejecting the reaction solution such as a spay method.

2.2. Ink Composition Attaching Step

The ink composition attaching step is a step of attaching the above-described water-based ink composition on the recording medium by discharging the water-based ink composition from the ink jet head 2, and with this step, an image formed of the ink composition is formed on the surface of the recording medium M.

Here, in the embodiment, the "image" means a recording pattern formed from the group of dots, and examples thereof include text printing and a solid image. In addition, the "solid image" means an image pattern which is an image in which dots of a pixel, which is a minimum recording unit region defined by a recording resolution, are recorded with respect to all pixels, and usually a recording region of the recording medium area is covered with ink so that other parts except for the recording medium area are not seen.

Figure 3:
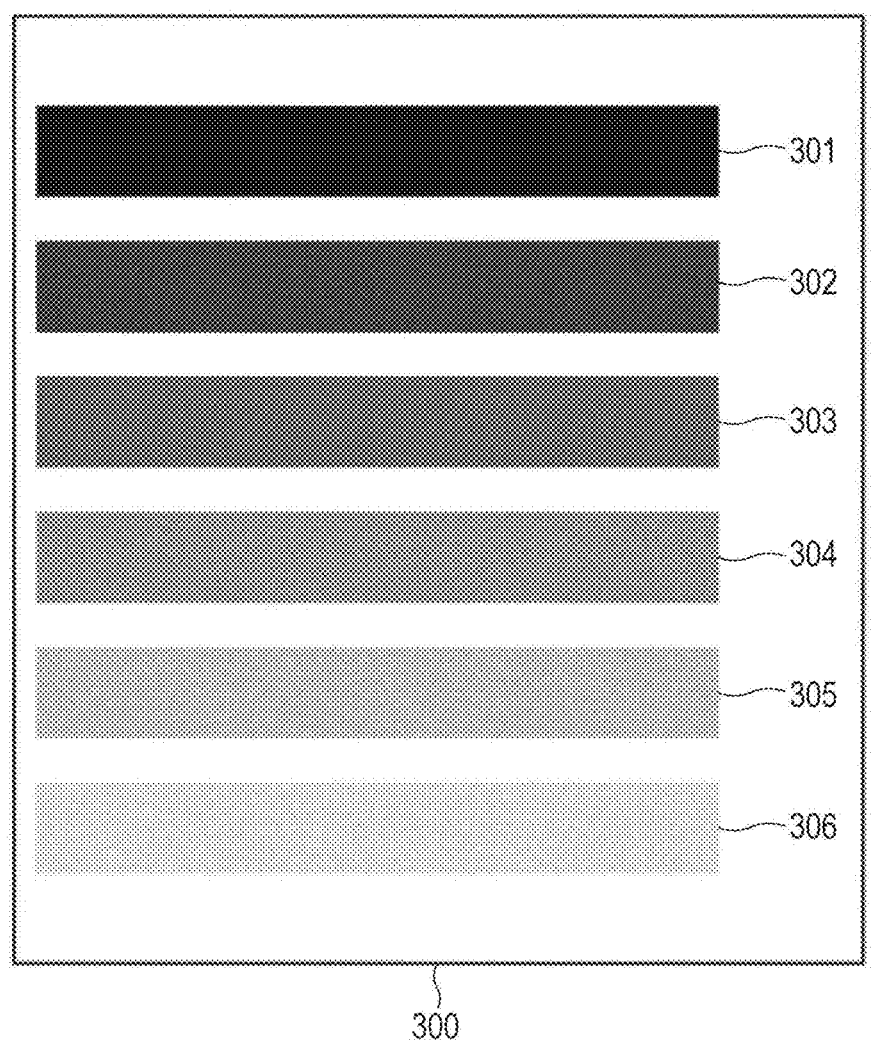
FIG. 3 is a plan view schematically illustrating a recording area.

FIG. 3 is a diagram schematically illustrating the recording region of the recording medium in the embodiment. In the recording medium 300, the recording regions 301 to 306 are recording regions in which the ink composition attaching step is performed. In FIG. 3, the recording region 301 is a recording region in which the attachment amount of the ink composition is largest in the recording regions 301 to 306, and in order of the recording regions 302, 303, 304, 305, and 306, the attachment amount of the ink composition is small than that of the recording region 301. Accordingly, in a case where the recording region in which the attachment amount of the ink composition is the largest in the recording regions 301 to 306 is defined as an area A, the recording region 301 is the area A. In addition, the recording region 302 is a recording region in which the attachment amount of the ink composition is the largest after the recording region 301, and the recording region 303 is a recording region in which the attachment amount of the ink composition is the largest after the recording region 302. The same is true for the recording regions 304, 305, and 306.

In the embodiment, one recording region in which the attachment amount of the ink composition is a predetermined value has a predetermined area in which it is possible to visually recognize that the attachment amount of the ink composition is substantially the same, and is a continuous recording region. The predetermined area is not limited, and for example, it is preferably equal to or larger than 1 mm$^2$.

In the recording method in the embodiment, in a case where two or more kinds of the ink compositions used in the embodiment are used, and a case where two or more kinds of the reaction solutions used in the embodiment are used, the attachment amount of the ink composition of a certain recording region may be set as the total ink attachment amount of the plurality kinds of the ink compositions. The same is true for the reaction solution.

At the time of recording an image, each recording region may be a recording region forming an image to be recorded such as a character image or a picture image, and the shape is not limited to a rectangle, and the number of recording regions is not limited. In addition, the difference in the ink attachment amount between the recording regions and the number of kinds of the differences are not limited, and there may be a difference in a smaller ink attachment amount, a difference in a larger ink attachment amount, or a larger number of kinds of differences. For example, it may be an expressive image with more gradated gradation or a more monotonous image. Further, the respective regions may be adjacent to each other. The respective regions may contain an area having a smaller area.

In the embodiment, the recording regions 301 to 306 of the recording medium 300 includes a region in which the attachment amount of the water-based ink composition is in a range of 2 times to 20 times the attachment amount of the reaction solution. When the ratio of the water-based ink composition and the attachment amount of the reaction solution is within the above range, it is possible to secure sufficient image quality even though the attachment amount of the reaction solution is smaller than the attachment amount of the ink, and it is possible to reduce the attachment amount of the reaction solution. With this, it is possible to secure the image quality and the abrasion resistance of the recorded material.

Further, the above-described value is preferably equal to or lower than 15 times, and is further preferably equal to or lower than 13 times. On the other hand, it is preferably equal to or greater than 2.5 times, is further preferably equal to or greater than three times, is still further preferably equal to or greater than five times, and is even still preferably equal to or greater than six times. When the ratio of the water-based ink composition and the attachment amount of the reaction solution is within the above range, the reaction with the aggregating agent is performed without excessively or insufficiently amount of ink, and thus it is possible to secure sufficient image quality, and to reduce the attachment amount of the reaction solution. With this, it is possible to secure the image quality and the abrasion resistance of the recorded material. In addition, the glossiness, the wet abrasion resistance, and the ink discharge stability are also excellent.

Furthermore, during the transporting of the recording medium, the recording medium sometimes bends in an upward direction of FIG. 1 and comes into contact with the ink jet head due to a trouble in transportation or the like. In this case, the reaction solution attached on the recording medium is attached to the ink jet head, the ink compositions react and aggregated in the nozzle, and the discharge stability is deteriorated in some cases. As a cause of the trouble in transportation, for example, a mismatch in driving between the driving unit for transporting positioned on the upstream side in the transporting direction and the driving unit for transporting positioned on the downstream side, and ease of deflection of the recording medium can be exemplified. In addition, in a case where the reaction solution attaching step is performed by using an ink jet method, mist of the reaction solution is generated so as to fly and be attached to the nozzle of the head which discharges the ink composition, the ink compositions react and aggregates with each other at the nozzle, and thus the discharge stability is deteriorated in some cases. In such cases, with the above-described value, the attachment amount of the reaction solution of the recording medium can be set relatively small, the amount of the generated mist of the reaction solution can be set small, and the ink discharge stability can be excellent.

Here, the above-described value is preferably in a range of 2 times to 20 times in the region A (for example, a solid part of the image) in which the attachment amount of the water-based ink composition is maximum. The region A has a large attachment amount of the ink composition, and thus it is difficult to dry, and the pigment flows with the drying, which is likely to cause unevenness. For this reason, in accordance with the attachment amount of the ink composition, the attachment amount of the reaction solution reacts with the ink composition is likely to be increased, and thereby the dryability becomes more deteriorated. With this, it is likely that the abrasion resistance and the ink discharge stability are deteriorated. Further, unevenness is generated due to agglutinates of the reacted ink, and thus the glossiness is likely to be deteriorated. In addition, in a case where the reaction solution is excessively attached, many unreacted aggregating agents are present, and the aggregating agents are likely to be dissolved in water and thus the wet abrasion resistance is also likely to be deteriorated. Even in such a case, in the embodiment, when the above-described value is set in the region A, the image quality, the ink discharge stability, the abrasion resistance, the glossiness, and the wet abrasion resistance become particularly excellent.

Furthermore, among the recording regions, the ratio of the ink attachment amount is preferably in a range of 2 times to 20 times over the region which is the region having smaller ink attachment amount than that of the region A, and is the region up to the region of 50% by mass of the ink attachment amount of the region A, and the ratio of the ink attachment amount is further preferably in a range of 2 times to 20 times over the region having smaller ink attachment amount than that of the region A, and is the region up to the region of 40% by mass of the ink attachment amount of the region A.

Also, among the recording regions, over the region which is the region having smaller ink attachment amount than that of the region A, and is the region up to the region of 50% by mass of the ink attachment amount of the region A, or over the region having smaller ink attachment amount than that of the region A, and is the region up to the region of 40% by mass of the ink attachment amount of the region A, the attachment amount of the reaction solution is preferably set to be within the preferable range of the attachment amount of the reaction solution of the region A, or is preferably set to be lower than the preferable range of the attachment amount of the reaction solution of the region A, independently from the attachment amount of the reaction solution of the region A.

The attachment amount of the water-based ink composition in the region in which the attachment amount of the water-based ink composition is in a range of 2 times to 20 times the attachment amount of the reaction solution is preferably equal to or less than 20 mg/inch$^2$, is further preferably equal to or less than 15 mg/inch$^2$, and is still further preferably equal to or less than 13 mg/inch$^2$. In addition, the lower limit of the attachment amount of the reaction solution in the region A is preferably equal to or greater than 5 mg/inch$^2$, is further preferably equal to or greater than 7 mg/inch$^2$, and is still further preferably equal to or greater than 8 mg/inch$^2$. It is preferable that the attachment amount of the ink composition is within the above range from the viewpoint that an expressive image can be formed.

The ink composition attaching step is preferably performed on the recording medium M heated in the heating step of heating the recording medium M by the IR heater 3 or the platen heater 4 before the ink composition attaching step or at the same time with the ink composition attaching step. With this, the ink can be rapidly dried on the recording medium M, bleeding can be suppressed, and thereby it is possible to form an image excellent in the abrasion resistance and the image quality.

The surface temperature of the recording medium M (primary heating temperature) at the time of attaching ink is preferably equal to or lower than 60° C., is further preferably equal to or lower than 55° C., is still further preferably equal to or lower than 45° C., is particularly preferably equal to or lower than 40° C., and is most preferably equal to or lower than 38° C. When the surface temperature of the recording medium at the time of attaching ink is within the above range, it is possible to suppress the influence of heat on the ink jet head 2 and to prevent the clogging of the nozzle 22. The lower limit of the surface temperature of the recording medium M at the time of ink jet recording is preferably equal to or higher than 25° C., is further preferably equal to or higher than 30° C., is still further preferably equal to or higher than 32° C., and is particularly preferably equal to or higher than 35° C. When the surface temperature of the recording medium M at the time of ink jet recording, the ink can be rapidly dried on the recording medium M, bleeding can be suppressed, and thereby it is possible to form an image excellent in the abrasion resistance and the image quality.

In a case where the ink jet recording apparatus 1 is a serial type recording apparatus, the time during which the recording medium faces the ink jet head 2 during one main scanning is preferably equal to or shorter than 12 seconds. The upper limit of this time is further preferably equal to or shorter than 10 seconds, and is particularly preferably equal to or shorter than 6 seconds. The lower limit of this time is preferably equal to or longer than 1 second, is further preferably equal to or longer than 2 seconds, is further preferably equal to or longer than and 3, and is particularly preferably equal to or longer than 4 seconds. The time during which the recording medium M faces the ink jet head 2 during one scanning is equal to the time that nozzles 22 which are not used during one main scanning receive heat from recording medium M. In other words, if this time is within the above range, the time that the nozzles 22 which are not used during one main scanning receive heat from the recording medium M is sufficiently short, and thus it is possible to suppress the drying of the ink composition in the nozzle 22 and composition variation thereof in the ink, and it is possible to reduce welding of the resin to an inner wall of the nozzle 22. As a result, the discharge stability at the time of continuous printing becomes excellent. Further, the above described time is preferably equal to or longer than the above range from the viewpoint that recording can be performed on a recording medium with a long scanning width and the recording apparatus is easily designed, and even in a case of performing recording as described above, this embodiment is particularly useful from the viewpoint of obtaining the discharge stability.

2.3. Secondary Heating Step

The ink jet recording method according to the embodiment may also include a secondary heating step of heating the recording medium M on which the water-based ink composition is attached by a hardening heater 5 as illustrated in FIG. 1 after the ink composition attaching step. With this, a resin or the like contained in the water-based ink composition on the recording medium M is melted so as to form an ink film. In this way, the ink film firmly fixes (attaches) to the recording medium M and thus it is possible to obtain a high-quality image excellent in abrasion resistance in a short period of time.

The heating temperature (secondary heating temperature) at which the surface of the recording medium M is heated by the hardening heater 5 is preferably in a range of 40° C. to 120° C., is further preferably in a range of 60° C. to 100° C., and is still further preferably in a range of 80° C. to 90° C. When the secondary heating temperature is within the above range, the abrasion resistance of the obtained recorded material is improved, and an ink film can be formed on the recording medium M with good adhesion.

Note that, after the secondary heating step, a step of cooling the ink composition on the recording medium M by the cooling fan 6 as illustrated in FIG. 1 may be provided.

2.4. Cleaning Step

The ink jet recording method according to the embodiment may include a cleaning step of discharging a ink composition and a reaction solution by units other than a pressure generation unit for discharging and recording ink, that is, mechanisms other than a mechanism for discharging ink for recording provided in the ink jet head 2.

A pressure generation unit for discharging and recording ink is a mechanism that is provided in the ink jet head 2 so as to discharge ink for recording, and examples thereof include a piezoelectric element for applying pressure to ink provided in a pressure chamber 21 and a heater element. As a cleaning step by the unit other than the pressure generation unit, a step of applying pressure from the outside to the ink jet head 2 so as to discharge the water-based ink composition from the nozzle 22, and a suction cleaning step of suctioning the ink from the nozzle 22 of the ink jet head 2 so as to discharge the ink from the nozzle. With these steps provided, even in a case where there is a fear that the resin may be welded to the inner wall of the ink jet head 2, such a fear can be suppressed and the clogging property can be further improved.

In addition, in the ink jet recording method according to the embodiment, it is preferable that the ink jet recording apparatus 1 is controlled without performing the above-described cleaning step, that is, the ink jet recording apparatus 1 is controlled so as to perform the recording for one hour or more with no cleaning. By controlling in this manner, the recording speed is not reduced by interrupting the recording along with the cleaning step. In addition, in the embodiment, even in a case of no cleaning, when the ink jet recording of the embodiment is performed by using the above-described ink composition, it is possible to record a good image excellent in the image quality and the abrasion resistance of the ink jet head 2, and the image is also excellent in the discharge stability.

Here, as another mechanism described above, a mechanism for applying pressure such as application of suction (negative pressure), application of positive pressure from the upstream of the head, and the like can be exemplified. This mechanism is not for ink discharge (such as flushing) using a function of the ink jet head. That is, in the recording, the aforementioned mechanism is not for the ink discharge using a function of discharging the ink from the ink jet head.

Also, the recording time may not be continuous, and it may be paused unless externally applying pressure to the ink jet head 2 and discharging the water-based ink composition from the nozzle 22. Here, the recording time is a recording time including the pause time between operations of scanning.

The recording time may be preferably equal to or longer than one hour, is preferably equal to or longer than 1.5 hours, is still further preferably equal to or longer than two hours, and is particularly preferably equal to or longer than three hours. The upper limit of the recording time is not limited, and is preferably equal to or shorter than ten hours, is further preferably equal to or shorter than five hours, and is still further preferably equal to or shorter than four hours.

In addition, in the ink jet recording method according to the embodiment, from the above-described viewpoint, it is preferable not to perform the cleaning step during the recording in one recording. Further, from the above-described viewpoint, it is preferable to perform the cleaning step at least either before recording or after recording.

As described above, the ink jet recording method according to the embodiment includes the reaction solution attaching step of attaching the reaction solution which contains an aggregating agent for aggregating a component of the water-based ink composition to the recording region of the recording medium, and the ink composition attaching step of attaching the water-based ink composition which contains a pigment dispersion containing a surface-treated pigment and water to the recording region of the recording medium by discharging the water-based ink composition from the ink jet head, in which the recording region includes a region in which an attachment amount of the water-based ink composition is in a range of 2 times to 20 times the attachment amount of the reaction solution. With this, the reaction between the pigment contained in the water-based ink composition and the aggregating agent in the reaction solution is sufficiently performed, and it is possible to obtain sufficient image quality even with small coating amount of the reaction solution. With this, even when the coating amount of the reaction solution is reduced, it is possible to secure sufficient image quality, and at the same time, it is possible to secure the abrasion resistance of the obtained recorded material by reducing the coating amount of the reaction solution. In this way, in the ink jet recording method according to the embodiment, it is possible to provide an ink jet recording method of obtaining a recorded material which is excellent in the discharge stability and is excellent in the image quality and the abrasion resistance by reducing the coating amount of the reaction solution.

3. Examples

Hereinafter, the embodiment of the invention will be further specifically described with Examples and Comparative Examples, but the invention is not limited to the following examples.

3.1. Ink
3.1.1. Preparing of Pigment Dispersion

Pigment dispersions 1 to 5 were used.

Pigment Dispersion 1 (Surface-Treated Carbon Black Pigment; Phosphonic Acid Group)

[2-(4-aminophenyl)-1-hydroxyethane-1,1-diyl] bisphosphonic acid-sodium salt was prepared in the following order. A 500 mL of three-necked flask was attached with a condenser with a gas outlet at the top of the condenser, a thermometer and a dry nitrogen inlet, and a 100 mL of pressure equalizing addition funnel. Initially, 32 g of phosphorous acid (380 mmol) and 160 mL of methanesulfonic acid (solvent) were added to the flask. 57.4 g of aminophenylacetic acid (380 mmol) was added little by little to this stirred mixture. The stirred mixture was heated to 65° C. for one to two hours so as to completely dissolve solids. The whole system was flushed with dry nitrogen and the temperature was lowered to 40° C. after dissolving all of the solids. 70 mL of $PCl_3$ (800 mmol) was slowly added to the obtained heated solution through an addition funnel. HCl gas generated from the reaction and this gas flowed into a drying tube through the gas outlet and then flowed into a concentrated NaOH solution in a beaker through the funnel. After performing the addition, a reaction mixture was stirred for two hours and heated at 40° C. After two hours, the temperature was raised to a temperature range of 65° C. to 70° C., and the mixture was stirred overnight. The resulting clear brown solution was cooled to room temperature and quenched by addition to 600 g of ice or water mixture. The obtained aqueous mixture was put into a 1 L beaker and heated at a temperature range of 90° C. to 95° C. for four hours (the top of the beaker can be covered with a glass plate). Subsequently, the mixture was cooled to room temperature and the pH of the mixture was adjusted to 4 to 5 with 50% NaOH solution (since the temperature was raised as a result of quenching, the NaOH solution was slowly added). The mixture was cooled to 5° C. in an ice bath for two hours and then the resulting solids were collected by suction filtration, washed with 1 L of cold deionized water, and dried at 60° C. overnight so as to obtain a white or off-white solid product (yield of 48 g, 39%). In this way, [2-(4-aminophenyl)-1-hydroxyethane-1,1-diyl] bisphosphonic acid-sodium salt was obtained.

Next, 20 g of the pigment (carbon black), 20 mmol of the compound obtained above and 20 mmol of nitric acid were added to 200 ml of deionized water, and the mixture was stirred at 6000 rpm for 30 minutes. Then, sodium nitrite (20 mmol) was slowly added to the mixed solution. The mixture was stirred for one hour in the same manner as above. ph was adjusted to be 10 with NaOH. After 30 minutes, the produced modified pigment was filtered with deionized water so as to obtain a pigment dispersion in which a pigment solid content was adjusted to 12% by mass. The pigment had a phosphonic acid group on the surface.

Pigment Dispersion 2 (Surface-Treated Carbon Black Pigment, Carbonyl Group)

Cab-O-Jet300 manufactured by Cabot Corporation was used.

Pigment Dispersion 3 (Surface-Treated Carbon Black Pigment, Sulfonyl Group)

Cab-O-Jet200 manufactured by Cabot Corporation was used.

Pigment Dispersion 4 (Resin Dispersed Carbon Black Pigment)

3.0 g of a styrene-acrylic acid type polymer dispersant (prepared by BASF Japan Ltd, Joncryl 682) and 1.8 g of triethanolamine were dissolved in 80.1 g of ion-exchanged water, and 15 g of carbon black and 0.1 g of a defoaming agent (prepared by Nissin Chemical Co., Ltd., Surfynol 104E) was added and dispersed with a paint shaker using zirconia beads so as to obtain a pigment dispersion P-4 (black).

Pigment Dispersion 5 (Surface-Treated Carbon Black Pigment, Phosphonic Acid Group)

[2-(4-aminophenyl)-1-hydroxypropane-1,1-diyl] bisphosphonic acid-sodium salt was obtained in the same order as that of the pigment dispersion 1 except that 1, 4-aminophenyl propionic acid prepared by hydrogenation of 4-nitrocinnamic acid was used instead of 4-aminophenylacetic acid in the preparing of the pigment dispersion. A pigment dispersion containing a surface-treated carbon black pigment was obtained by using the same method as that used in the pigment dispersion 1 except that the obtained compound was used in the treatment. The pigment had a phosphonic acid group.

3.1.2. Preparation of Ink

Inks 1 to 8 (Examples and Comparative Examples) were obtained by mixing and stirring each component so as to obtain a blending ratio in Table 1. Note that, the numerical values indicated in Table 1 all indicate % by mass, and pure water was added so that the total mass of the ink was 100% by mass. In addition, regarding the pigment dispersion and the resin emulsion, the values are shown in terms of solid content.

Meanwhile, details of the substances indicated in Table 1 are as follows.

Resin Emulsion

Resin emulsion 1 (product name, "JONCRYL HRC-1645)", prepared by BASF Japan Ltd)

Resin emulsion 2 (product name, "Boncoat SA-6360", prepared by DIC Corporation)

Resin emulsion 3 (product name, "JONCRYL 537J", prepared by BASF Japan Ltd.)

Resin emulsion 4 was prepared as follows.

In a reaction vessel, a dropping device, a thermometer, a water-cooled reflux condenser, and a stirrer were provided, 100 parts of ion-exchanged water was added, and 0.2 parts of ammonium persulfate as a polymerization initiator was added under nitrogen atmosphere of 70° C. while stirring, then a monomer solution containing 5 parts of styrene, 17 parts of methyl acrylate, 30 parts of methyl methacrylate, and 5 parts of acrylic acid was dropped into the reaction vessel, and reacted so as to polymerize and prepare a shell polymer. Thereafter, a mixed solution of 0.2 parts of potassium persulfate, 10 parts of styrene, and parts of n-butyl acrylate was added dropwise and polymerization reaction was performed while stirring at 70° C., then neutralized with sodium hydroxide so as to adjust the pH to be in a range of 8 to 8.5, and filtered with 0.3 μm of filter so as to obtain a resin emulsion 4. Based on this, the resin emulsion was prepared by changing the kinds of the monomers and the resin ratio during resin emulsion preparation so that the conductivity of the ink composition after being adjusted became the value indicated in Table 1.

Surfactant

"BYK348" (product name, silicone-based surfactant, prepared by BYK Japan KK)

TABLE 1

| | INK 1 | INK 2 | INK 3 | INK 4 | INK 5 | INK 6 | INK 7 | INK 8 | INK 9 |
|---|---|---|---|---|---|---|---|---|---|
| PIGMENT DISPERSION 1 | 4 | | 4 | | | 4 | 4 | | 4 |
| PIGMENT DISPERSION 2 | | 4 | | | | | | | |
| PIGMENT DISPERSION 3 | | | | 4 | | | | | |
| PIGMENT DISPERSION 4 | | | | | | | | 4 | |
| PIGMENT DISPERSION 5 | | | | | 4 | | | | |
| RESIN EMULSION 1 | 5 | 5 | 5 | 5 | 5 | | | 5 | |
| RESIN EMULSION 2 | | | | | | 5 | | | |
| RESIN EMULSION 3 | | | | | | | 5 | | |
| RESIN EMULSION 4 | | | | | | | | | 5 |
| SURFACTANT BYK348 | 0.5 | 0.5 | 0.5 | 0.5 | 0.5 | 0.5 | 0.5 | 0.5 | 0.5 |
| DIETHYLENE GLYCOL | 15 | 15 | 10 | 15 | 15 | 15 | 15 | 15 | 15 |
| GLYCERIN | | | 5 | | | | | | |
| 1,2 HEXANEDIOL | 2 | 2 | 2 | 2 | 2 | 2 | 2 | 2 | 2 |
| 2 PYRROLIDONE | 2 | 2 | 2 | 2 | 2 | 2 | 2 | 2 | 2 |
| WATER | RESIDUAL | RESIDUAL | RESIDUAL | RESIDUAL | RESIDUAL | RESIDUAL | RESIDUAL | RESIDUAL | RESIDUAL |
| TOTAL | 100 | 100 | 100 | 100 | 100 | 100 | 100 | 100 | 100 |
| CONDUCTIVITY (μs/cm) | 1945 | 2765 | 1945 | 1681 | 2005 | 1150 | 3055 | 3012 | 3152 |
| STORAGE STABILITY | A | B | A | B | A | A | B | C | C |

3.2. Evaluation of Ink

Regarding each of the above-described inks, ink conductivity was measured, and a test for ink storage stability was performed. The results are indicated in Table 1.

Measurement of Conductivity

The measurement of the conductivity was performed by using a conductivity meter (EC Tester 11+, manufactured by Eutech Instruments).

Test for Ink Storage Stability

The ink composition was put into a glass bottle until eight tenth, and kept in a constant temperature environment of 75° C. for three days. The viscosity and particle diameter change before and after storage were observed and the ink storage stability was evaluated according to the following criteria. The change in viscosity was evaluated by measuring the viscosity of the ink at room temperature using a viscometer (product name "MCR-300" manufactured by Physica Co., Ltd.) and calculating the change in viscosity according to the following Expression.

[(viscosity after storage−initial viscosity)/(initial viscosity)]×100(%)

The particle diameter change was evaluated by measuring a volume average diameter (MV) in the particle diameter distribution in the ink before and after storage, and calculating the change in viscosity according to the following Expression.

[(MV after storage−initial MV)/(initial MV)]×100 (%)

In the measurement of volume average diameter in the particle diameter distribution, a particle diameter distribution meter (model "Nanotrac UPA-EX 150" manufactured by Nikkiso Co., Ltd.) using the dynamic light scattering method as the measurement principle was used.

Evaluation Criteria

A: Viscosity change ≤20%, particle diameter change 30%
B: Viscosity change ≤20%, 30%<particle diameter change≤50%
C: Viscosity change >20%, particle diameter change >50%

3.3. Preparing of Reaction Solution

In accordance with the composition indicated in Table 2, the respective components were mixed and stirred, and filtrated with a membrane filter of 10 μm so as to prepare reaction solution 1 to 4. Note that, the numerical values indicated in Table 2 all indicate % by mass, and pure water was added such that the total mass of the reaction solution is 100% by mass.

TABLE 2

| | REACTION SOLUTION 1 | REACTION SOLUTION 2 | REACTION SOLUTION 3 | REACTION SOLUTION 4 |
|---|---|---|---|---|
| AGGREGATING AGENT 1 | 5 | | | |
| AGGREGATING AGENT 2 | | 5 | | |
| AGGREGATING AGENT 3 | | | 5 | |
| AGGREGATING AGENT 4 | | | | 5 |
| DIETHYLENE GLYCOL | 20 | 20 | 20 | 15 |

TABLE 2-continued

|  | REACTION SOLUTION 1 | REACTION SOLUTION 2 | REACTION SOLUTION 3 | REACTION SOLUTION 4 |
|---|---|---|---|---|
| GLYCERIN |  |  |  | 5 |
| 1,2 HEXANEDIOL | 2 | 2 | 2 | 2 |
| SURFACTANT BYK348 | 1 | 1 | 1 | 1 |
| WATER | REIDUAL | REIDUAL | REIDUAL | REIDUAL |
| TOTAL | 100 | 100 | 100 | 100 |

Meanwhile, details of the substances indicated by the product names in Table 2 are as follows.

Aggregating Agent

Aggregating agent 1 (calcium acetate-hydrate, polyvalent metal salt)

Aggregating agent 2 (product name, "Cathio Master (registered trademark) PD", amine epichlorohydrin condensation type aqueous polymer solution, prepared by Yokkaichi Chemical Co., Ltd., cationic resin)

Aggregating agent 3 (acetic acid, organic acid)

Aggregating agent 4 (calcium pantothenate, polyvalent metal salt)

Surfactant

"BYK348" (product name, silicone-based surfactant, prepared by BYK Japan KK)

3.4. Evaluation Test of Ink Jet Recording Method

The evaluation test of the ink jet recording method was performed by using each ink indicated in Table 1 and the reaction solution indicated in Table 2.

3.4.1. Recording Test

A recording was performed by using a modifier of an ink jet printer (product name, "SC-S50650", manufactured by SEIKO EPSON CORPORATION). First, a head was filled with ink and a reaction solution, and was ink-jet coated at a maximum resolution of 1440×1440 dpi with 10 ng of drop amount so that the attachment amount per area was indicated in Tables 3 and 4 by overlapping or thinning dots. Subsequently, the reaction solution attached surface is ink-jet coated with the ink with which the head is filled at a maximum resolution of 1440×1440 dpi so that the attachment amount per area was indicated in Tables 3 and 4 by overlapping or thinning dots. During the recording step, the platen heater was adjusted such that a surface temperature of the recording medium becomes a temperature as indicated in Tables 3 and 4. In addition, after the recording, a recorded material was discharged from the printer, and dried at 80° C. for five minutes. As the recording medium a polyvinyl chloride sheet (product number ORAJET 3164 XG-010 (1600 mm), Glossy salt Bigley glue, (prepared by ORAFOL Co., Ltd.)) was used. The ink jet printer was provided with a suction cleaning mechanism.

3.4.2. Evaluation of Image Quality

A solid pattern of 30×30 mm was created under the conditions of the above 3.4.1 Recording test, and presence or absence of printing unevenness was visually checked and the image quality was evaluated according to the following criteria. Evaluation criteria A: state (unevenness) in which ink concentration is uneven in solid pattern is not observed B: small unevenness is observed in solid pattern C: large unevenness is observed in solid pattern D: in addition to C, contour of pattern is not linear but is blurred 3.4.3. Evaluation of Glossiness The glossiness at 60° of the recording unit of the recorded material obtained in 3.4.1. Recording test (manufactured by Konica Minolta, Inc., GM-268 Plus) was measured with a gloss meter and evaluated according to the following criteria.

Evaluation Criteria

A: glossiness at 60° is equal to or greater than 60

B: glossiness at 60° is equal to or greater than 50 and less than 60

C: glossiness at 60° is equal to or greater than 40 and less than 50

D: glossiness at 60° is less than 40

3.4.4. Evaluation of Wet Abrasion Resistance

A solid pattern of 20×80 mm was created under the conditions of 3.4.1. Recording test so as to stand for one hour in a laboratory under the condition of room temperature (25° C.), and then the recording surface of the recorded material was evaluated by using a Gakushin-type rubbing tester AB-301 (product name, manufactured by Tester Sangyo). Specifically, the surface of the recording medium on which an image was recorded was reciprocally rubbed 40 times with a frictional piece attached with a white cotton cloth (based on JIS L 0803) wet with water, under a load of 20 g. Further, a peeling state of an image (coated film) on the surface of the recording medium was visually checked and was evaluated according to the following criteria.

Evaluation Criteria

A: no peeled area of printed surface

B: peeled area of printed surface is less than 5%

C: peeled area of printed surface is equal to or greater than 5% and less than 15%

D: peeled area of printed surface is equal to or greater than 15%

3.4.5. Evaluation of Abrasion Resistance

A solid pattern of 20×80 mm was created under the conditions of 3.4.1. Recording test so as to stand for one hour in a laboratory under the condition of room temperature (25° C.), and then the recording surface of the recorded material was evaluated by using a Gakushin-type rubbing tester AB-301 (product name, manufactured by Tester Sangyo). Specifically, the surface of the recording medium on which an image was recorded was reciprocally rubbed 30 times with a frictional piece attached with a white cotton cloth (based on JIS L 0803) under a load of 300 g. Further, a peeling state of an image (coated film) on the surface of the recording medium was visually checked and was evaluated according to the following criteria.

Evaluation Criteria

A: no peeled area of printed surface

B: peeled area of printed surface is less than 5%

C: peeled area of printed surface is equal to or greater than 5% and less than 15%

D: peeled area of printed surface is equal to or greater than 15%

3.4.6. Evaluation of Discharge Stability

Recording was continuously performed for two hours under the recording conditions of the above 3.4.1. Recording test. After recording, the number of non-discharge nozzles among 360 nozzles was determined, and the discharge stability was evaluated according to the following criteria. Note that, during the recording, a suction cleaning was not performed. The suction cleaning was performed after the evaluation so as to recover the discharge of the non-discharge nozzles. When the nozzles were observed after the evaluation, in the nozzles in which non-discharge occurred, an agglomerate such as a pigment or a resin dispersion contained in the ink attached to the nozzle, which was the cause of non-discharge.

Evaluation Criteria

A: the number of non-discharge nozzles (nozzle omission) is 0
B: the number of non-discharge nozzles is in a range of 1 to 4
C: the number of non-discharge nozzles is in a range of 5 to 8
D: the number of non-discharge nozzles is equal to or greater than 9

TABLE 3

|  | example 1 | example 2 | example 3 | example 4 | example 5 | example 6 | example 7 | example 8 | example 9 | example 10 |
|---|---|---|---|---|---|---|---|---|---|---|
| ink | ink 1 | ink 1 | ink 1 | ink 1 | ink 1 | ink 1 | ink 2 | ink 3 | ink 4 | ink 5 |
| reaction solution | reaction solution 1 | reaction solution 1 | reaction solution 1 | reaction solution 1 | reaction solution 1 | reaction solution 1 | reaction solution 1 | reaction solution 1 | reaction solution 1 | reaction solution 1 |
| ink attachment amount (mg/inch$^2$) | 10 | 15 | 5 | 10 | 10 | 11 | 10 | 10 | 10 | 10 |
| reaction solution attachment amount (mg/inch$^2$) | 1.5 | 2.1 | 0.8 | 3 | 0.8 | 0.6 | 1.5 | 1.5 | 1.5 | 1.5 |
| ink attachment amount/reaction solution attachment amount | 6.7 | 7.1 | 6.3 | 3.3 | 12.5 | 18.3 | 6.7 | 6.7 | 6.7 | 6.7 |
| primary heating temperature (° c.) | 35 | 35 | 35 | 35 | 35 | 35 | 35 | 35 | 35 | 35 |
| image quality | A | B | B | A | B | C | B | C | B | A |
| glossiness | B | B | B | C | A | A | B | B | B | B |
| wet abrasion resistance | B | B | B | C | A | A | B | C | B | B |
| abrasion resistance | B | A | C | B | B | A | B | C | B | B |
| discharge stability | B | B | B | C | B | B | B | A | B | B |

TABLE 4

|  | example 11 | example 12 | example 13 | example 14 | example 15 | example 16 | example 17 | comparative example 1 | comparative example 2 | comparative example 3 | comparative example 4 | comparative example 5 | comparative example 6 |
|---|---|---|---|---|---|---|---|---|---|---|---|---|---|
| ink | ink 6 | ink 7 | ink 1 | ink 1 | ink 1 | ink 1 | ink 9 | ink 1 | ink 1 | ink 8 | ink 1 | ink 8 | ink 8 |
| reaction solution | reaction solution 1 | reaction solution 1 | reaction solution 2 | reaction solution 3 | reaction solution 4 | reaction solution 1 | reaction solution 1 | reaction solution 1 | reaction solution 1 | reaction solution 1 | — | reaction solution 1 | reaction solution 1 |
| ink attachment amount (mg/inch$^2$) | 10 | 10 | 10 | 10 | 10 | 10 | 10 | 10 | 10 | 10 | 10 | 10 | 11 |
| reaction solution attachment amount (mg/inch$^2$) | 1.5 | 1.5 | 3 | 3. | 3 | 0.8 | 1.5 | 6 | 0.4 | 1.5 | — | 3 | 0.6 |
| ink attachment amount/reaction solution attachment amount | 6.7 | 6.7 | 3.3 | 3.3 | 3.3 | 12.5 | 6.7 | 1.7 | 25.0 | 6.7 | — | 3.3 | 18.3 |
| primary heating temperature (° c.) | 35 | 35 | 35 | 35 | 35 | 40 | 35 | 35 | 35 | 35 | 35 | 35 | 35 |
| image quality | C | A | B | B | B | A | A | A | D | C | D | C | D |

TABLE 4-continued

| | example 11 | example 12 | example 13 | example 14 | example 15 | example 16 | example 17 | comparative example 1 | comparative example 2 | comparative example 3 | comparative example 4 | comparative example 5 | comparative example 6 |
|---|---|---|---|---|---|---|---|---|---|---|---|---|---|
| glossiness | B | B | B | C | C | A | B | D | B | B | B | C | A |
| wet abrasion resistance | A | B | B | C | C | A | C | D | A | B | A | D | A |
| abrasion resistance | B | B | B | B | C | B | B | D | A | B | A | D | B |
| discharge stability | B | B | C | C | C | C | C | C | A | D | A | D | C |

3.5. Evaluation Result

First, in the evaluation of the ink indicated in Table 1, the inks 1 to 7 containing a surface-treated pigment was excellent in the storage stability as compared with the ink 8 containing a resin dispersed pigment. In addition, in the inks 1 to 7, in a case where the modified functional group of surface-treated pigment is a phosphonic acid which is a phosphorus-containing group, there was a tendency that the storage stability was higher than a case of a sulfonyl group or a carbonyl group. The ink 8 containing the resin dispersed pigment has high conductivity of the ink composition and deteriorated storage stability as compared with the inks 1 to 7 containing the surface-treated pigment. Note that, the inks 1 to 7 have low conductivity of the ink composition as compared with the ink 9 and is more excellent in the storage stability than the ink 9.

Then, the results of the evaluation test of the ink jet recording method are indicated in Tables 3 and 4. Examples in which ink which contains a pigment dispersion containing a surface-treated pigment and a reaction solution are used, and an ink attachment amount is 2 to 20 times the attachment amount of the reaction solution are all excellent in the image quality, the abrasion resistance, and the ink discharge stability. In contrast, Comparative Examples which are not different from Examples are all deteriorated in any one of the image quality, the abrasion resistance, and the ink discharge stability.

In detail, from the comparison of Examples 1 and 4, it was found that as the attachment amount of the reaction solution was larger than the attachment amount of the ink, reaction was performed without excessively or insufficiently amount of ink, and thus the image quality was particularly improved; on the other hand, when the attachment amount of the reaction solution was large, the discharge stability presumed to be caused by increase of reaction solution mist was likely to be deteriorated.

In contrast, from the comparison of Examples 1 and 6, as the attachment amount of the reaction solution was smaller than the attachment amount of the ink, agglutinates were smaller, and thus the glossiness was improved, and the film strength was increased by less aggregating agent. As a result, the abrasion resistance and the wet abrasion resistance were particularly excellent, the reaction solution mist generated in the reaction solution attaching step was small, and the evaluation of the discharge stability was likely to be particularly high.

Also, from the comparison of Examples 1 to 3, the wet abrasion resistance was likely to be improved as the ink attachment amount was larger.

From the comparison of Examples 1 and 8, when the ink contained a high boiling point solvent, the ink became difficult to dry and the discharge stability was improved, but the image quality, the wet abrasion resistance, and the abrasion resistance were decreased. From this aspect, it was found that the invention is particularly useful in that it was possible to obtain the excellent discharge stability even when obtaining the higher abrasion resistance and wet abrasion resistance by reducing the content of the high boiling point solvent of the ink.

From the comparison of Examples 1 and 10, the modified functional group of the surface-treated pigment was highly evaluated also in the case of different kinds of phosphonic acids and furthermore, from the comparison of Examples 7 and 9, ink in which the surface-treated pigment contained a phosphoric acid group had higher reactivity with the aggregating agent, and thereby the image quality was likely to be particularly high. In addition, from the comparison of Examples 1, 11, 12, and 17, as the conductivity was higher, the image quality was particularly excellent; on the other hand, as the conductivity is lower, the wet abrasion resistance, the abrasion resistance, and the discharge stability were particularly excellent.

From Examples 13 to 15, it was possible to achieve both of the image quality and the abrasion resistance even if polyvalent metal salt, a cationic resin, or an organic acid was used as an aggregating agent of the reaction solution. Particularly, when the polyvalent metal salt was used as the aggregating agent, the image quality was improved, and the glossiness, the wet abrasion resistance, and the abrasion resistance were improved when using the cationic resin. Regarding Example 15, the reaction solution contained a high boiling point solvent, the reaction solution was difficult to dry and the abrasion resistance was deteriorated.

In addition, from the comparison of Examples 5 and 16, although the image quality was improved as drying during the printing advances in such a case where the primary heating temperature was raised, the dispersed state changed due to evaporation of moisture in the vicinity of the nozzle surface, and thus the discharge stability was deterioration. From this aspect, it was found that the invention is particularly useful in that the excellent image quality can be obtained even when lowering the primary heating temperature and obtaining mote excellent ink discharge stability.

In Comparative Example 1, the attachment amount of the ink was excessively smaller than the attachment amount of the reaction solution, and aggregating agents were excessively present, and thus the glossiness, the wet abrasion resistance, the abrasion resistance, and the discharge stability were particularly deteriorated. On the other hand, in Comparative Example 2, since the ink attachment amount was excessively large with respect to the attachment amount of the reaction solution and the reaction was insufficient, the image quality was deteriorated, but the abrasion resistance, the wet abrasion resistance, and the discharge stability were improved.

Comparative Examples 3, 5, and 6 were not surface-treated pigments, Comparative Example 3 was deteriorated in the ink discharge stability, Comparative Example 5 was deteriorated in the ink discharge stability and the abrasion resistance, Comparative Example 6 was deteriorated in the image quality, and regardless of the ink attachment amount with respect to the attachment amount of the reaction solution, it was not possible to make any of the image quality, the ink discharge stability, and the abrasion resistance excellent.

In Comparative Example 4, since the reaction solution was not used, the image quality was deteriorated, but the wet abrasion resistance, the abrasion resistance, and the discharge stability were improved as compared with Example 1. From this, it was found that the invention is necessary from the viewpoint of obtaining the excellent abrasion resistance and the ink discharge stability in a case of obtaining excellent image quality by using the reaction solution.

As described above, the ink jet recording method according to the embodiment includes the reaction solution attaching step of attaching the reaction solution which contains an aggregating agent for aggregating a component of the water-based ink composition to the recording region of the recording medium, and the ink composition attaching step of attaching the water-based ink composition which contains a pigment dispersion containing a surface-treated pigment and water to the recording region of the recording medium by discharging the water-based ink composition from the ink jet head, in which the recording region includes a region in which an attachment amount of the water-based ink composition is in a range of 2 times to 20 times the attachment amount of the reaction solution. In this case, ink is excellent in the storage stability, and in the ink jet recording method using this ink, it is possible to obtain a recorded material which is excellent in the image quality, the abrasion resistance, the glossiness, and the wet abrasion resistance, and also possible to obtain the ink jet recording method excellent in the discharge stability.

The invention is not limited to the above-described embodiments, and various modifications are possible. For example, the invention includes a configuration substantially the same as that described in the embodiment (for example, a configuration having the same function, method, and result, or a configuration having the same object and effect). Further, the invention includes a configuration in which non-essential parts of the configuration described in the embodiment are replaced. Further, the invention includes a configuration that can achieve the same effects as the configuration described in the embodiment, or a configuration that can achieve the same object. In addition, the invention includes a configuration in which a well-known technique is added to the configuration described in the embodiment.

The entire disclosure of Japanese Patent Application No. 2017-063446, filed Mar. 28, 2017 is expressly incorporated by reference herein.

What is claimed is:

1. An ink jet recording method comprising:
attaching a reaction solution which contains an aggregating agent for aggregating a component of a water-based ink composition to a recording region of a recording medium; and
attaching the water-based ink composition which contains a pigment dispersion containing a surface-treated pigment and water to the recording region of the recording medium by discharging the water-based ink composition from an ink jet head,
wherein the recording region includes a region in which an attachment amount of the water-based ink composition is in a range of 2 times to 20 times an attachment amount of the reaction solution; and
wherein the surface-treated pigment includes at least one of a phosphorus-containing group, a sulfonyl group, and a carbonyl group on a surface thereof.

2. The ink jet recording method according to claim 1, wherein the attaching of the reaction solution is attaching the reaction solution to the recording region of the recording medium by discharging the reaction solution from the ink jet head.

3. The ink jet recording method according to claim 1, wherein a conductivity of the water-based ink composition is in a range of 500 μs/cm to 3100 μs/cm.

4. The ink jet recording method according to claim 1, further comprising:
heating the recording medium,
wherein the attaching of the water-based ink composition is attaching the water-based ink composition to the recording medium heated in the heating.

5. The ink jet recording method according to claim 1, wherein the attachment amount of the reaction solution is equal to or less than 2.5 mg/inch$^2$ in a region in which the attachment amount of the water-based ink composition is in a range of 2 times to 20 times the attachment amount of the reaction solution.

6. The ink jet recording method according to claim 1, wherein a content of the aggregating agent of the reaction solution is in a range of 1% by mass to 15% by mass.

7. The ink jet recording method according to claim 1, wherein the attachment amount of the water-based ink composition is in a range of 5 mg/inch$^2$ to 17 mg/inch$^2$ in the region in which the attachment amount of the water-based ink composition is in a range of 2 times to 20 times the attachment amount of the reaction solution.

8. The ink jet recording method according to claim 1, wherein the aggregating agent is at least one selected from the group consisting of a polyvalent metal salt, a cationic compound, and an organic acid.

9. The ink jet recording method according to claim 1, wherein the recording medium is a recording medium having low ink absorbability or a recording medium having non-ink absorbability.

10. The ink jet recording method according to claim 1, wherein in the water-based ink composition, a content of an organic solvent having a standard boiling point of higher than 280° C. is equal to or less than 3% by mass.

11. The ink jet recording method according to claim 1, wherein a region in which the attachment amount of the water-based ink composition is the maximum in the recording region is a region in which the attachment amount of the water-based ink composition is in a range of 2 times to 20 times the attachment amount of the reaction solution.

12. The ink jet recording method according to claim 1, wherein the surface-treated pigment is a carbon black surface-treated pigment.

13. The ink jet recording method according to claim 1, wherein the ink jet head is a drop on demand ink jet head.

14. The ink jet recording method according to claim 1, wherein the ink jet head is a drop on demand ink jet head that uses a piezo method or a thermal jet method.

15. The ink jet recording method according to claim 1, wherein a conductivity of the water-based ink composition is in a range of 1000 to 3100 μm/cm.

\* \* \* \* \*